(12) United States Patent
Xu

(10) Patent No.: US 11,978,034 B2
(45) Date of Patent: May 7, 2024

(54) SYSTEM BUILT BY CONNECTION BETWEEN A MOBILE TERMINAL AND A SERVICE PROVIDING DEVICE, AND SERVICE PROVIDING METHOD

(71) Applicant: Wei Xu, Shanghai (CN)

(72) Inventor: Wei Xu, Shanghai (CN)

( * ) Notice: Subject to any disclaimer, the term of this patent is extended or adjusted under 35 U.S.C. 154(b) by 0 days.

(21) Appl. No.: 17/681,345

(22) Filed: Feb. 25, 2022

(65) Prior Publication Data

US 2022/0207514 A1 Jun. 30, 2022

Related U.S. Application Data

(63) Continuation of application No. 16/334,625, filed as application No. PCT/CN2017/109531 on Nov. 6, 2017, now Pat. No. 11,295,292.

(30) Foreign Application Priority Data

Sep. 20, 2016 (CN) .......................... 201610835052.X

(51) Int. Cl.
*G06Q 20/32* (2012.01)
*G06F 8/61* (2018.01)
(Continued)

(52) U.S. Cl.
CPC ........... *G06Q 20/3276* (2013.01); *G06F 8/61* (2013.01); *G06K 7/1417* (2013.01);
(Continued)

(58) Field of Classification Search
CPC .. G06Q 20/3276; G06Q 20/065; G06Q 20/06; G06Q 20/327; G06Q 20/321;
(Continued)

(56) References Cited

U.S. PATENT DOCUMENTS

2013/0290187 A1* 10/2013 Itwaru ................ G06Q 20/3227
705/44
2014/0143037 A1 5/2014 Zhou et al.

FOREIGN PATENT DOCUMENTS

CN 101093566 A 12/2007
CN 101211435 A 7/2008
(Continued)

OTHER PUBLICATIONS

Chinese Office Action dated Jan. 2, 2019 from Chinese Patent Application No. 201610835052.X (with English language translation attached).
(Continued)

*Primary Examiner* — Matthew Mikels
(74) *Attorney, Agent, or Firm* — Amster, Rothstein, & Ebenstein LLP

(57) ABSTRACT

The present disclosure provides a system constructed by connecting a mobile terminal and a service providing device, and a service providing method, wherein the service providing device and the mobile terminal are directly connected via an interface of the mobile terminal; the service providing device provides a service independently or through collaboration between the service providing device and various parties such as the mobile terminal and/or the background server based on the service information parsed and extracted the code information, identification information of any one or more parties among the user, the first mobile terminal, and the service providing device, and/or information bound to the identification information. Through active code scanning or passive code scanning or a combination of the two, the present disclosure may conveniently and quickly implement sensing access and effectively enhance security for operations such as mobile payment, etc.

22 Claims, 12 Drawing Sheets

(51) Int. Cl.
*G06K 7/14* (2006.01)
*G06K 19/06* (2006.01)
*G06Q 20/38* (2012.01)
*G06Q 20/40* (2012.01)
*H04L 67/53* (2022.01)
*H04W 4/50* (2018.01)

(52) U.S. Cl.
CPC ... *G06K 19/06037* (2013.01); *G06Q 20/3229* (2013.01); *G06Q 20/326* (2020.05); *G06Q 20/3278* (2013.01); *G06Q 20/38215* (2013.01); *G06Q 20/401* (2013.01); *H04L 67/53* (2022.05); *H04W 4/50* (2018.02)

(58) Field of Classification Search
CPC ............ G06K 7/1417; G06K 19/06037; H04L 67/53; H04L 65/40; H04W 4/50; H04W 4/80

See application file for complete search history.

(56) References Cited

FOREIGN PATENT DOCUMENTS

| | | | |
|---|---|---|---|
| CN | 102164202 | A | 8/2011 |
| CN | 102711057 | A | 10/2012 |
| CN | 102915604 | A | 2/2013 |
| CN | 103077456 | A | 5/2013 |
| CN | 103489098 | A | 1/2014 |
| CN | 104050567 | A | 9/2014 |
| CN | 105631661 | A | 6/2016 |
| CN | 105701659 | A | 6/2016 |
| CN | 106412041 | A | 2/2017 |

OTHER PUBLICATIONS

Chinese Search Report dated Dec. 21, 2018 from Chinese Patent Application No. 201610835052.X (with English language translation attached).

Singapore Written Opinion dated Apr. 1, 2020 from Singapore Patent Application No. 11201902484W (English language translation).

United Kingdom Office Action and Examination Report under Section 18(3) dated Aug. 25, 2021 for Patent Application No. GB1902776.1 (6 pp.).

International Search Report received for PCT Patent Application No. PCT/CN2017/109531, mailed on Jan. 29. 2018, 6 page (3 pages of English Translation of International Search Report, 3 pages of International Search Report).

* cited by examiner

SYSTEM BUILT BY CONNECTION BETWEEN A MOBILE TERMINAL AND A SERVICE PROVIDING DEVICE, AND SERVICE PROVIDING METHOD

CROSS-REFERENCE TO RELATED APPLICATIONS

This application is a division of U.S. patent application Ser. No. 16/334,625, filed on Mar. 19, 2019, which is a U.S. National Stage entry under 35 U.S.C. § 371 of PCT International Patent Application No. PCT/CN2017/109531, filed on Nov. 6, 2017, which claims priority from Chinese Patent Application No. CN 201610835052.X, filed on Sep. 20, 2016, the entire contents of each of which are incorporated by reference herein.

FIELD

Embodiments of the present disclosure generally relate to applications of bar-code images, and more particularly relate to a service providing device, a mobile terminal directly connected with a service providing device, a system providing system built by direct connection between the mobile terminal and the service providing device, and a service providing method of the service providing system.

BACKGROUND

Mobile payment refers to a service that allows a user to directly or indirectly transmit, using a mobile terminal (usually a mobile phone), a payment instruction to a banking or financial institution to make a monetary payment or funds transfer action via the Internet or proximity sensing, so as to perform a bill payment for a product or service purchased. The mobile payment needs to solve two fundamental problems: identity verification and account system. Dependent on different instant natures of settlements for payment transaction, mobile payments may be divided into remote payments and proximity payments. Different from the remote payments, which directly graft the Internet technology on a mobile device, the proximity payments (including infrared payment, Bluetooth payment, acoustic wave payment, iBeacon payment (Bluetooth Low Energy), etc.) further require that a mobile terminal and a reader to have a uniform technical infrastructure and matching hardware constructions, wherein connection between the mobile terminal and the reader via a near-field communication technology provides a precondition of information transmission for information reading and account verification, so as to satisfy functionalities of storing, identifying and verifying user account information.

With constant growth of commercial application scenarios, the proximity payment mode, represented by two-dimensional code payment and NFC payment, has become gradually popular in the market. The mobile payment approach, mainly APPLE PAY, requires binding a bank card to a mobile phone, performing transaction processing such as sensitive data encryption operations via a security chip SE, and then completing the communication via an NFC chip, such that a corresponding device "NPC POS machine" for recognizing the NFC chip needs to be equipped external to the mobile terminal, which increases deployment costs and restricts application scenarios.

In contrast, the two-dimensional code payment refers to a light sensing access where a mobile terminal scans a two-dimensional code to realize communication interaction; it is not required to add an NFC chip or security chip SE to the mobile terminal or additionally equip a POS machine external to the mobile terminal; besides, the two-dimensional code deployment scenarios are not restricted, such that it is convenient to use and easier to promote and popularize. However, despite of the above advantages, the two-dimensional code payment faces a payment security issue. Even with innovation and evolution of identity verification technologies such as password verification and fingerprint verification, the current mobile terminals may still complete a payment transaction via cooperation between common hardware configurations (e.g., a camera, a decoder) and applications. A chip-level encryption is absent.

Additionally, two-dimensional code services on mobile phones are currently divided into two types: mobile phone-read type applications and mobile phone-reading type applications. The mobile phone-read type applications generally refer to such applications that after a terminal user completes the transaction via various kinds of online or non-online manners, an electronic voucher in a two-dimensional code form is transferred via a mobile network and displayed on a screen of the mobile terminal. A merchant may read and verify the authenticity of the transaction via a specific device. The mobile phone-read type applications may be applied to electronic tickets, electronic coupons, electronic redemption vouchers, electronic membership cards, and payment vouchers, etc. For the mobile phone-read type applications, the mobile terminal generally only serves as a device for storing and displaying two-dimensional codes. The current mobile payment realized in a passive code scanning mode is here illustrated with displaying a payment code of Wechat or Alipay on a consumer's mobile terminal screen as an example, where a dedicated smart terminal of the merchant scans the payment code to recognize a user payment account corresponding to the payment code for settlement; however, if the merchant's terminal is hijacked by a virus, which captures the payment code in bad faith to propagate and steal the money therein while the code is scanned, the consumer can hardly notice it in short term and the loss almost cannot be avoided.

For the mobile phone-reading type applications, the mobile terminal with a camera serves as a tool for reading the two-dimensional code, and a two-dimensional code reading software is installed on the mobile terminal. The camera captures a two-dimensional code image on a plurality of carriers; the two-dimensional code reading software decodes the captured two-dimensional code image; in this way, without entering a URL address, the mobile terminal may be quickly lined to a webpage corresponding to the code information of the two-dimensional code. However, when such a similar active code scanning in mobile payment, the captured object is generally a URL link, not a payment mark (i.e., a mark with a unique numerical value in place of the main account number of the bank card, which ensures that application of the numerical value is restricted to a specific merchant, channel or device), such that it is easily hijacked by a Trojan virus, posing a hidden security risk. Besides, there lacks a uniform code scanning standard. For example, offline codes for Wechat and Alipay are separately distributed, which are not universal with each other.

Chinese patent application No. 200510033918.7, filed on Mar. 31, 2005, entitled "MOBILE TERMINAL SHOPPING METHOD AND SYSTEM THEREOF," discloses a method and a system for implementing mobile terminal shopping using a two-dimensional code. A mobile terminal captures a two-dimensional code with a built-in camera and decodes the two-dimensional code; then, the mobile terminal sends a payment request message to a payment subsystem which completes the payment.

Chinese patent No. ZL200480005625.1, filed on Mar. 8, 2004, entitled "METHOD FOR PROVIDING MOBILE SERVICES BY USING CODE GRAPH," discloses a method and a system for providing mobile services using a code graph, specifically a method and a system for providing content providing services, geographical information providing services, product information providing services, taxi call services, personal contact information providing services or payment services using two-dimensional codes. A mobile terminal captures a two-dimensional code with a built-in camera and decodes the two-dimensional code; then, the mobile terminal sends a service providing request message to a service provider server, such that the service provider server itself providing a service to the mobile terminal or the service provider server communicates with another server to provide a service to the mobile terminal.

The technical solutions revealed in the two patent applications above show that the existing mobile terminals must be connected to a background server which implements provisioning of various kinds of services. However, if a wireless network connecting the mobile terminal to the background server has weak signals or no signals, it is hard for the mobile terminal to access the services in an offline state.

SUMMARY

In view of the drawbacks in the prior art, an object of the present disclosure is to provide a service providing device, a mobile terminal directly connected with the service providing device, a service providing system constructed based on direct connection between the mobile terminal and the service providing device, and a service providing method for the service providing system, which, by leveraging applications of code medium technologies such as a bar code image, may not only quickly access to communication and enjoy the convenience of mobile payment, but also enables chip-level encryption processing with an enhanced security; another object of the present disclosure is to enable a service providing device to implement an independent provision of services at a mobile terminal side, without participation of a background server, or alternatively to enable the service providing device to provide services through a collaboration with the mobile terminal and/or a background server. A further object of the present disclosure is to provide an adaptability to both reading-type applications and read-type applications and a combined application of the two types.

To achieve the objects above, a technical solution of the present disclosure is to provide a service providing method based on parsing of code information, comprising: parsing, by a service providing device connected with a first mobile terminal via an interface of a first mobile terminal, code information obtained by the service providing device to extract service information corresponding to the parsed code information;

providing, by the service providing device, a service based on the extracted service information and auxiliary information provided or stored by the service providing device, wherein the auxiliary information at least includes identification information of any one or more of: a user of the first mobile terminal, a user of the service providing device, the first mobile terminal, and the service providing device, and/or information bound to the identification information;

maintaining a same network connection state during service providing; or, including, during the service providing, a plurality of phases, wherein at least one phase has a different network connection state; and wherein the network connection state refers to online or offline;

wherein when the network connection state is offline, the service providing device or the first mobile device does not access a network capable of interacting with a background server, and then the service providing device provides the service independently or through collaboration with the first mobile terminal;

when the network connection state is online, the service providing device, or the first mobile device, or the service providing device and the first mobile device, access a network capable of interacting with one or more background servers, then the service providing device provides the service independently or through collaboration with the first mobile terminal and/or the background server; and wherein the code information obtained by the service providing device is obtained by decoding a first code medium obtained by the service providing device, the first mobile terminal, or the background server, or is received by the service providing device from the first mobile terminal or the background server.

Optionally, any interacting part transmits or receives the subsequent information to or from any other one or more interacting parties: interactive information, interactive code information corresponding to the interactive information, or an interactive code medium corresponding to the interactive information, or a carrier of the interactive code medium, or link information for obtaining the interactive information, interactive code medium, or carrier;

wherein the corresponding interactive code information is generated based on the interactive information according to a predetermined coding rule, and then the corresponding interactive code medium is generated based on the interactive code information;

the interactive information includes one or more of:

extracted service information;

intermediate information needed for service providing;

notification information for feeding back a service providing result;

first identification information, referring to identification information of any one or more of: the user of the first mobile terminal, the user of the service providing device, the first mobile terminal, the service providing device, and the background server;

second identification information, referring to identification information of a third party user, a third party mobile terminal, or a third party server, which are designated by the first mobile terminal, the service providing device, or the background server;

information correspondingly bound to the first identification information and/or second identification information;

attribute information corresponding to one or more of: the user of the first mobile terminal, the user of the service providing device, the first mobile terminal, or the service providing device; and the interacting party includes: the first mobile terminal, the service providing device, the background server, the third party mobile terminal, and the third party server.

Optionally, the service providing method further comprises: generating corresponding code information based on code information corresponding to the service information according to the predetermined coding rule and then generating a corresponding first code medium based on the code information;

transmitting the first code medium, the corresponding code information for generating the code medium, the link information for obtaining the code medium or the code information corresponding to the code medium, or the carrier for the code medium or corresponding code information or link information, to the first mobile terminal or the service providing device, or releasing the same to a place accessible to the user of the first mobile terminal or the user of the service providing device such that the first mobile terminal or the service providing device autonomously obtains them; and receiving or obtaining a same first code medium for one or more times, and decoding and parsing the first code medium received or obtained at each time for one or more times so as to extract service information.

Optionally, the service providing method further comprising: when parsing the code information to determine that the first code medium is generated according to the predetermined coding rule, continuing to perform an operation of extracting the service information and subsequent operations; when parsing the code information to determine that the code medium is not generated according to the predetermined coding rule, not performing the operation of extracting the service information or the subsequent operations after prompting a parsing error alert, or providing code information with the parsing error, or providing information which may be linked to an actual corresponding page of the code information with the parsing error or a link to the actual corresponding page; wherein in the case of continuously performing the operation of extracting the service information, the extracted service information at least includes command information, the command information being configured for actuating the service providing device to execute a flow of operations set thereto, or actuating the service providing device and the background server or the first mobile terminal in collaboration therewith to execute the flow of operations respectively set thereto.

Optionally, the service providing device or the first mobile terminal provides the service or collaborates in providing the service via a client software configured thereto based on a parameter which results from parsing the code information and is automatically substituted in the client software; when it is determined that a client software for substituting and interpreting the parameter obtained from parsing the code information is not installed, the client software is automatically installed for the service providing device or the first mobile terminal; wherein the substituted parameter comes from the parsed and extracted service information, or from the service information and the auxiliary information.

Optionally, the service providing method further comprises: presenting or releasing the first code medium or the interactive code medium via the first mobile terminal, such that any of the background server, the third mobile terminal, or the third party server may obtain the first code medium or the interactive code medium to decode and parse; wherein the first code medium or interactive code medium respectively refers to any one or any combination of: a bar code image generated in a pattern of one-dimensional code, two-dimensional code, or multi-dimensional code; an optical lattice diagram generated in a form of light-shadow ray or refurbishing frequency variation or in a form of visible light or UV or infrared light or polarized light; and a digitalized acoustic wave or radio wave generated with a specific law or a specific frequency variation pattern Optionally, the service providing method further comprises: generating a to-be-paid order by the service providing device, the first mobile terminal, or the background server based on the extracted service information; and deducting, by the service providing device, the first mobile terminal, or the background server, an order-related payment from a pre-deposited amount under a designated account number, or generating a postpaid bill including the order-related payment for the designated account number; wherein the designated account number refers to an account number bound to the identification information of any one or more of: the service providing device, the first mobile terminal, the user of the first mobile terminal or the user of the service providing device, a payer designed by the user of the first mobile terminal or the user of the service providing device; and the designated account number, link information for retrieving the designated account number, a pre-saved code medium or its carrier, is stored in the service providing device, the first mobile terminal, or the background server; and the designated account number, the pre-deposited amount, or link information for retrieving the designated account number is included in corresponding code information obtained from recognizing and decoding the pre-saved code medium or in a result of parsing the code information corresponding to the pre-saved code medium optionally, when order processing is performed in an offline network connection state, the service providing device or the first mobile terminal actuated by the service providing device deducts the order-related payment from the pre-deposited amount under the designated account number stored in the service providing device or in the first mobile terminal;

or, when order processing is performed in an offline network connection state, the service providing device or the first mobile terminal actuated by the service providing device records information about the order-related payment under the designated account number stored in the service providing device or the first mobile terminal; and when the network connection becomes online, the service providing device or the first mobile terminal actuated by the service providing device provides, to the background server, information about a record of the order-related payment under the designated account number so as to generate a postpaid bill;

or, when order processing is performed in an online network connection state, the service providing device or the first mobile terminal actuates the background server to deduct the order-related payment from the pre-deposited amount under the designated account number, or to record the information about the order-related payment under the designated account number so as to generate a postpaid bill.

Optionally, the service providing device is a USB device with a USB connector, which is connected to a first mobile terminal with a corresponding USB interface;

or, the service providing device is a memory card, which is connected to a first mobile terminal with a corresponding memory card slot or memory card interface;

or, the service providing device is a SIM card, which is connected to a first mobile terminal with a corresponding SIM card slot or SIM card interface;

or, the service providing device is an eSIM card, which is connected to a first mobile terminal with a corresponding eSIM card integration interface or is integrated in the first mobile terminal;

or, the service providing device is a device having a wired or wireless communication interface, which is in signal connection with a first mobile terminal having a corresponding wired or wireless communication interface, wherein the signal connection allows the service providing device to communicate with the first mobile terminal in the case of offline or online;

or, the service providing device is a combination of at least two components that are respectively connected to the first mobile terminal in same or different manners; one component in the combination is any one in a first group including a USB device, a memory card, a SIM card, an eSIM card, and a device with a wired or wireless communication interface; the other component in the combination is any one in a second group including a USB device, a memory card, a SIM card, an eSIM card, and a device with a wires or wireless communication interface.

Optionally, the service providing device is a component having a code information parsing unit and storing a designated account number or a pre-saved code medium;

or, the service providing device is a combination of two components, where one component has the code information parsing unit and the other component stores the designated account number or the pre-saved code medium;

wherein the code information parsing unit stores a code parsing rule matching a predetermined coding rule; the code information parsing unit parses the code information obtained by the service providing device, and/or parses the code information corresponding to the pre-saved code medium.

Optionally, at the time of generating the first code medium or at any time point therebefore, the auxiliary information is provided to one or more of the following recipients; or at the time of service providing or collaborating in service providing or at any time point therebefore, the auxiliary information is provided to one or more of the following recipients; wherein the recipients include: the service providing device, the first mobile terminal, the background server, a third party code medium generating device for generating the first code medium, an operator system of the client software, and an operator system of the service providing device.

optionally, the service providing device, the first mobile terminal, or the background server checks and compares verification information provided by the user of the first mobile terminal or the user of the service providing device with verification-comparison information stored in the service providing device, the first mobile terminal, or the background server; and the service is provided when it is determined that the verification information is consistent with the verification-comparison information.

Another technical solution of the present disclosure is to provide a service providing method based on parsing of code information, comprising: implementing a connection between a service providing device and a first mobile terminal via an interface of the first mobile terminal at least upon generating code information or a first code medium corresponding thereto or at least upon collaborating in service providing;

wherein the service providing device provides or stores auxiliary information as well as a predetermined coding rule and/or a matching code parsing rule, the auxiliary information at least including: identification information of any one or more of: a user of the first mobile terminal, a user of the service providing device, the first mobile terminal, and the service providing device, and/or information bound to the identification information;

generating, by the first mobile terminal, the service providing device, or a third party code medium generating device respectively designated thereby, code information corresponding to service information according to a predetermined coding rule, and the first code medium corresponding to the code information; wherein the service information includes the auxiliary information;

transmitting, to a first background server or a second mobile terminal, the code medium, the corresponding code information for generating the first code medium, link information for obtaining the first code medium or the code information corresponding thereto, or a carrier for the first code medium, the code information, or the link information, or releasing the same to a place accessible to a user of the first background server or the user of the second mobile terminal for the first background server or the second mobile terminal to retrieve by themselves;

decoding and parsing the first code medium obtained by the first background server or the second mobile terminal, or parsing the code information obtained by the first background server or the second mobile terminal, to extract the corresponding service information, wherein the first background server or the second mobile terminal provides a service independently based on the extracted service information, or the first background server or the second mobile terminal collaborates with any one or more of collaborators below to provide the service: the first mobile terminal; the service providing device; one or more third party servers or one or more third party mobile terminals designated by the first mobile terminal, the service providing device, the first background server, or the second mobile terminal.

Optionally, the first background server or the second mobile terminal or a third party decoding-parsing device respectively designated thereby decodes and parses the obtained code medium or the obtained code information based on the code parsing rule matching the predetermined coding rule, wherein the parsed and extracted service information at least includes command information for actuating the first background server or the second mobile terminal or a collaborator thereof to execute flow of operations respectively set therefor;

when parsing the code information and determining that the first code medium is generated according to the predetermined coding rule, the first background server or the second mobile terminal continues performing the operation of extracting the service information and subsequent operations; and when parsing the code information and determining that the first code medium is not generated according to the predetermined coding rule, the first background server or the second mobile terminal does not performing the operation of extracting the service information or the subsequent operations after prompting a parsing error alert, or providing code information with the parsing error, or providing information which may be linked to an actual corresponding page of the code information with the parsing error or a link to the actual corresponding page.

Optionally, the service providing device or the first mobile terminal collaborates in service providing via a client software based on a parameter automatically substituted into the client software; wherein the parameter substituted into the client software comes from one or more sources below: corresponding code information for generating the first code medium, service information for generating the code information corresponding to the first code medium, code information obtained from decoding the first code medium, service information extracted from the parsed code information, and auxiliary information.

Optionally, at the time of generating the code medium or at any time point therebefore, the auxiliary information is provided to one or more of the following recipients; or at the time of service providing or collaborating in service providing or at any time point therebefore, the auxiliary information is provided to one or more of the following recipients; wherein the recipients include: the service providing device, the first mobile terminal, the first background server, the second mobile terminal, the third party server, the third party mobile terminal, the third party code medium generating device, an operator system of the client software, and an operator system of the service providing device.

Optionally, any interacting part transmits or receives the subsequent information to or from any other one or more interacting parties: interactive information, interactive code information corresponding to the interactive information, or an interactive code medium corresponding to the interactive information, or a carrier of the interactive code medium, or link information for obtaining the interactive information, interactive code medium, or carrier; wherein the corresponding interactive code information is generated based on the interactive information according to the predetermined coding rule, and then the corresponding interactive code medium is generated based on the interactive code information;

the interactive information includes one or more of:
extracted service information;
intermediate information needed for service providing;
notification information for feeding back a service providing result;
identification information of any one or more of: the first mobile terminal, the service providing device, the first background server, the second mobile terminal, the third mobile terminal, the third party server, user of the first mobile terminal or the second mobile terminal or the third party mobile terminal, an operator of the first background server or the third part server;
information correspondingly bound to the identification information;
attribute information corresponding to one or more of: the user of the first mobile terminal, the user of the service providing device, the first mobile terminal, or the service providing device; and
the interacting parties include the first mobile terminal, the service providing device, the first background server, the second mobile terminal, the third party mobile terminal, and the third party server.

Optionally, the service providing device or the first mobile terminal stores a designated account number or link information for retrieving the designated account number, or stores a pre-saved code medium or a carrier thereof;

corresponding code information obtained from recognizing and decoding the pre-saved code medium or a result of parsing the code information corresponding to the pre-saved code medium includes the designated account number or the link information for retrieving the designated account number;

the designated account number refers to an account number bound to the identification of any one or more of: the service providing device, the first mobile terminal, the user of the first mobile terminal or the user of the service providing device, a payer designed by the user of the first mobile terminal or the user of the service providing device; and any of the first background server, the third party server, the second mobile terminal or the third party mobile terminal as a payer, which obtains the designated account number, the link information for obtaining the designated account number, the pre-saved code medium, or the carrier for the pre-saved code medium, deducts an order-related payments from the pre-deposited amount under the designated account number, or generates, for the designated account number, a post-paid bill for the order-related payment.

Optionally, the service providing device is a USB device with a USB connector, which is connected to the first mobile terminal with a corresponding USB interface;

or, the service providing device is a memory card, which is connected to a first mobile terminal with a corresponding memory card slot or memory card interface;
or, the service providing device is a SIM card, which is connected to a first mobile terminal with a corresponding SIM card slot or SIM card interface;
or, the service providing device is an eSIM card, which is connected to a first mobile terminal with a corresponding eSIM card integration interface or is integrated in the first mobile terminal;
or, the service providing device is a device having a wired or wireless communication interface, which is in signal connection with a first mobile terminal having a corresponding wired or wireless communication interface, wherein the signal connection allows the service providing device to communicate with the first mobile terminal in the case of offline or online;
or, the service providing device is a combination of at least two components that are respectively connected to the first mobile terminal in same or different manners; one component in the combination is any one in a first group including a USB device, a memory card, a SIM card, an eSIM card, and a device with a wired or wireless communication interface; the other component in the combination is any one in a second group including a USB device, a memory card, a SIM card, an eSIM card, and a device with a wires or wireless communication interface.

Optionally, the service providing device is a component having a code information parsing unit and storing a designated account number or a pre-saved code medium; or, the service providing device is a combination of two components, where one component has the code information parsing unit and the other component stores the designated account number or the pre-saved code medium; wherein the code information parsing unit stores the preset code parsing rule and/or the code parsing rule matching thereto; and the code information parsing unit further parses the code information corresponding to the pre-saved code medium.

Optionally, the service providing device or the first mobile terminal checks and compares verification information provided by the user of the first mobile terminal or the user of the service providing device with verification-comparison information stored in the service providing device, the first mobile terminal, the background server, or the third party server; wherein the service is provided when it is determined that the verification information is consistent with the verification-comparison information.

Optionally, the first code medium or interactive code medium respectively refers to any one or any combination of: a bar code image generated in a pattern of one-dimensional code, two-dimensional code, or multi-dimensional code; an optical lattice diagram generated in a form of light-shadow ray or refurbishing frequency variation or in a form of visible light or UV or infrared light or polarized light; and a digitalized acoustic wave or radio wave generated with a specific law or a specific frequency variation pattern.

The present disclosure further provides a service providing device, wherein the service providing device implements a connection with a first mobile terminal via an interface of the first mobile terminal; when the network connection state is offline, the service providing device or the first mobile device does not access a network capable of interacting with a background server, and then the service providing device provides the service independently or through collaboration with the first mobile terminal; and when the network connection state is online, the service providing device, or the first mobile device, or the service providing device and the first mobile device, access a network capable of interacting with one or more background servers, then the service providing device provides the service independently or through collaboration with the first mobile terminal and/or the background server;

the service providing device comprising:
a code information parsing unit configured for parsing code information obtained by the service providing device to extract service information corresponding to the parsed code information, such that the service providing device may provide a service based on the extracted service information and auxiliary information stored in the service providing device;
a transmitting/receiving unit configured for interacting with the first mobile terminal in the case of offline or online; wherein in the case of online, the transmitting/receiving unit interacts with the first mobile terminal and/or the background server; the code information obtained by the service providing device is received by the transmitting/receiving unit from the first mobile terminal or the background server; and
a memory unit storing the auxiliary information, wherein the auxiliary information at least includes identification information of any one or more of a user of the first mobile terminal, a user of the service providing device, the first mobile terminal, and the service providing device, and/or information bound to the identification information.

Optionally, the memory unit of the service providing device stores a designated account number, or a pre-deposited amount under the designated account number, link information for retrieving the designated account number, a pre-saved code medium or a carrier thereof; the corresponding code information obtained from recognizing and decoding the pre-saved code medium or a result of parsing the code information corresponding to the pre-saved code medium includes the designated account number, the pre-deposited amount, or link information for retrieving the designated account number; and
the designated account number refers to an account number bound to identification information of at least one of: the service providing device, the first mobile terminal, the user of the first mobile terminal or service providing device, and a payer designated by the user.

Optionally, the service providing device transmits or receives via the transmitting/receiving unit: interactive information, an interactive code medium corresponding to the interactive information, interactive code information corresponding to the interactive code medium, a carrier of the interactive code medium, or link information for obtaining the interactive information, the interactive code medium, or the carrier;
the interactive code medium transmitted by the service providing device is generated by a code medium generating unit arranged for the service providing device based on the interactive code information corresponding to the interactive information, or is received by the service providing device via the transmitting/receiving unit;
the service providing device parses, via the code information parsing unit, the interactive code information corresponding to the interactive code medium received by the service providing device, so as to obtain interactive information transmitted to the service providing device;
the interactive information transmitted or received by the service providing device includes one or more of:
intermediate information needed for service providing;
notification information for feeding back a service providing result;
first identification information of any one or more of the user of the first mobile terminal, the user of the service providing device, the first mobile terminal, the service providing device, and the background server;
second identification information of a third party user, a third party mobile terminal, or a third party server designated to any one or more parties above;
information correspondingly bound to the first identification information and/or the second identification information;
attribute information corresponding to one or more of: the user of the first mobile terminal, the user of the service providing device, the first mobile terminal, or the service providing device.

Optionally, the code information obtained by the service providing device is obtained by decoding the first code medium obtained by the first mobile terminal or the service providing device;
the first code medium refers to any one or any combination of: a bar code image where the code information is generated in a pattern of one-dimensional code, two-dimensional code, or multi-dimensional code; an optical lattice diagram where the code information is generated in a form of light-shadow ray or refurbishing frequency variation or in a form of visible light or UV or infrared light or polarized light; and a digitalized acoustic wave or radio wave generated with a specific law or a specific frequency variation pattern.

Optionally, the code information parsing unit of the service providing device, when parsing the code information to determine that the first code medium is generated according to the predetermined coding rule, continues to perform an operation of extracting the service information and subsequent operations, and when parsing the code information to determine that the code medium is not generated according to the predetermined coding rule, does not perform the operation of extracting the service information or the subsequent operations after prompting a parsing error alert, or providing code information with the parsing error, or providing information which may be linked to an actual corresponding page of the code information with the parsing error or a link to the actual corresponding page; wherein in the case of continuously performing the operation of extracting the service information, the extracted service information at least includes command information, the command information being configured for actuating the service providing device to execute a flow of operations set thereto, or actuating the service providing device and the background server or the first mobile terminal in collaboration therewith to execute the flow of operations respectively set thereto.

Optionally, the code information parsing unit of the service providing device automatically substitutes a parameter obtained from parsing the code information into a client software configured for the service providing device or the first mobile terminal, such that the service providing device may provide a service; or the first mobile terminal may collaborate in service providing via the client software; wherein the substituted parameter comes from the parsed and extracted service information or from the service information and auxiliary information;

the service providing device further comprises:
a client software monitoring unit configured for monitoring whether the service providing device or the first mobile terminal is installed with a client software for substituting and interpreting the parameter obtained from parsing the code information;
a client software installing unit configured for automatically installing the client software when the client software monitoring unit determines that the service providing device or the first mobile terminal is not installed with the client software.

Optionally, the memory unit of the service providing device further stores verification-comparison information or link information for retrieving the verification-comparison information; at the time of being connected to the first mobile terminal or before service providing, the service providing device, the background server, or the first mobile terminal extracts the verification-comparison information or its link information from the memory unit, for checking and comparing the verification-comparison information with the verification information provided by the user of the first mobile terminal or the user of the service providing device.

Optionally, at the time of generating the first code medium or at any time point therebefore, the auxiliary information is provided to one or more of the following recipients; or at the time of service providing or collaborating in service providing or at any time point therebefore, the auxiliary information is provided to one or more of the following recipients; wherein
the recipients include: the service providing device, the first mobile terminal, the background server, a third party code medium generating device for generating the first code medium, an operator system of the client software, and an operator system of the service providing device.

Optionally, the service providing device is a USB device with a USB connector, which is connected to a first mobile terminal with a corresponding USB interface;
or, the service providing device is a memory card, which is connected to a first mobile terminal with a corresponding memory card slot or memory card interface;
or, the service providing device is a SIM card, which is connected to a first mobile terminal with a corresponding SIM card slot or SIM card interface;
or, the service providing device is an eSIM card, which is connected to a first mobile terminal with a corresponding eSIM card integration interface or is integrated in the first mobile terminal;
or, the service providing device is a device having a wired or wireless communication interface, which is in signal connection with a first mobile terminal having a corresponding wired or wireless communication interface, wherein the signal connection allows the service providing device to communicate with the first mobile terminal in the case of offline or online;
or, the service providing device is a combination of at least two components that are respectively connected to the first mobile terminal in same or different manners; one component in the combination is any one in a first group including a USB device, a memory card, a SIM card, an eSIM card, and a device with a wired or wireless communication interface; the other component in the combination is any one in a second group including a USB device, a memory card, a SIM card, an eSIM card, and a device with a wires or wireless communication interface.

The present disclosure further provides a mobile terminal, wherein the mobile terminal implements connection with a service providing device via an interface arranged in the mobile terminal; the mobile terminal comprising
an obtaining module configured for obtaining a first code medium of a corresponding type, wherein the obtained first code medium is decoded by a decoding unit configured to any of the mobile terminal, the service providing device, or a background server to obtain corresponding code information, and a code information parsing unit parses the decoded code information to extract corresponding service information;
a transmitting/receiving unit configured for interacting with the service providing device when a network connection state is offline or online and interacting with the service providing device and/or background server when the network connection state is online; wherein when the network connection state is offline, the service providing device or the mobile terminal does not access a network capable of interacting with the background server, such that the service providing device provides a service independently or through collaboration with the mobile terminal based on the parsed and extracted service information as well as auxiliary information provided or stored in the service providing device; when the network connection state is online, the service providing device or the mobile terminal, or the service providing device and the mobile terminal, access to a network capable of interacting with one or more background servers, such that the service providing device provides a service independently or through collaboration with the mobile terminal and/or the background server based on the parsed and extracted service information as well as the auxiliary information provided or stored in the service providing device;
an input unit for inputting information when interacting with the service providing device and/or the background server;
a presenting unit for presenting the input information or output information upon interaction, and configured for presenting a first code medium obtained by the mobile terminal, decoded code information, parsed and extracted service information or auxiliary information;
wherein the auxiliary information at least includes identification information of any one or more of: a user of the first mobile terminal, a user of the service providing device, the first mobile terminal, and the service providing device, and/or information bound to the identification information.

Optionally, a parameter obtained after parsing the code information is automatically substituted into the client software configured for the mobile terminal, such that the mobile terminal may execute, based on the parsed and extracted service information, a flow of operations set for the mobile terminal in the service information, so as to collaborate for service providing, wherein the substituted parameter comes from the parsed and extracted service information or comes from the service information and the auxiliary information.

Optionally, the mobile terminal is further provided with an acquiring module configured for acquiring attribute information corresponding to one or more of the user of the mobile terminal, the user of the service providing device, the mobile terminal, or the service providing device; or, configured for acquiring verification information provided by the user so as to check and compare the verification information with verification-comparison information pre-saved in the mobile terminal, the service providing device, or background server.

Optionally, the mobile terminal transmits or receives via the transmitting/receiving unit: interactive information, an interactive code medium corresponding to the interactive information, interactive code information corresponding to the interactive code medium, a carrier of the interactive code medium, or link information for obtaining the interactive information, the interactive code medium, or the carrier;
  the interactive code medium sent by the mobile terminal is generated by a code medium generating unit arranged for the mobile terminal or the service providing device based on the interactive code information corresponding to the interactive information, or is received by the mobile terminal via the transmitting/receiving unit;
  the code information parsing unit of the service providing device or a further code information parsing unit autonomously configured for the mobile terminal parses the interactive code information corresponding to the interactive code medium received by the service providing device to obtain interactive information sent to the service providing device;
  the interactive information transmitted or received by the mobile terminal includes one or more of:
  service information;
  intermediate information needed for service providing;
  notification information for feeding back a service providing result;
  first identification information, referring to identification information corresponding to any one or more of the user of the mobile terminal, the user of the service providing device, the mobile terminal, the service providing device, and the background server;
  second identification information, referring to identification of a third party user, a third party mobile terminal, or a third party server designated by any one or more parties above;
  information correspondingly bound to the first identification information and/or the second identification information; and
  attribute information corresponding to one or more of the user of the mobile terminal, the user of the service providing device, the mobile terminal, or the service providing device.

Optionally, the presenting unit of the mobile terminal is configured for presenting the first code medium and/or the interactive code medium, such that a further acquiring module configured to the background server may obtain the first code medium and/or the interactive code medium to decode and parse;
  the first code medium or the interactive code medium respectively refers to any one or any combination of: a bar code image generated in a pattern of one-dimensional code, two-dimensional code, or multi-dimensional code; an optical lattice diagram generated in a form of light-shadow ray or refurbishing frequency variation or in a form of visible light or UV or infrared light or polarized light; and a digitalized acoustic wave or radio wave generated with a specific law or a specific frequency variation pattern.

Optionally, the service providing device is any one of a USB device, a memory card, a SIM card, an eSIM card, or a device having a wired or wireless communication interface, and the mobile terminal connected thereto has a corresponding USB interface, a memory card slot or a memory card interface, a SIM card slot or SIM card interface, an eSIM card integration interface, or a wired or wireless communication interface;
  or, the mobile terminal is simultaneously connected to at least two components of the service providing device, wherein one component of the service providing device has a code information parsing unit, referring to any one in a first group including a USB device, a memory card, a SIM card, an eSIM card, and a device with a wired or wireless communication interface; the other component in the service providing device has a memory unit, referring to any one in a second group including a USB device, a memory card, a SIM card, an eSIM card, and a device with a wires or wireless communication interface.
  or, the mobile terminal is a standalone device or a first combination of a plurality of devices, wherein at least one device of the plurality of devices in the first combination is a wearable device; and the service providing device connected to the mobile terminal refers to a USB device, a memory card, a SIM card, an eSIM card, or a device with a wired or wireless communication interface;
  or, the mobile terminal is a combination of a body part and a plurality of external parts, wherein the acquiring module of the mobile terminal is disposed in the body part; the presenting unit is disposed in the body part or in the at least one external part; the service providing device refers to a USB device, or a memory card, or a SIM card, or an eSIM card, or a device with a wired or wireless communication interface, which is connected to the body part of the mobile terminal or at least one externally connected part.

The present disclosure further discloses a service providing system, wherein the service providing device described in any optional embodiment above is connected to the mobile terminal described in any optional embodiment above, and the service providing device provides a service independently or through collaboration between the service providing device and various parties such as the mobile terminal and/or a background based on identification information of any one or more of a user of the mobile terminal, a user of the service providing device, the mobile terminal, and the service providing device, and/or auxiliary information such as information bound with the identification information.

The present disclosure further provides an alternative service providing system, wherein at least at the time of generating code information or a first code medium corresponding thereto, or at least at the time of collaborating for service providing, a service providing device is enabled to implement connection with a first mobile terminal via an interface of the first mobile terminal; wherein the service providing device has a memory unit which stores a predetermined coding rule as well as auxiliary information, wherein the auxiliary information includes identification information of any one or more of a user of the first mobile terminal, a user of the service providing device, the first mobile terminal, and the service providing device, and/or information bound to the identification information;

a code medium generating unit configured to the service providing device generates, or the service providing device actuates a further code medium generating unit configured to the first mobile terminal to generate, the code information corresponding to the service information and a first code medium corresponding to the code information according to a predetermined coding rule;

a transmitting/receiving unit configured to the service providing device transmits, or the service providing device actuates a further transmitting/receiving unit configured to the first mobile terminal to transmit, the first code medium, the corresponding code information for generating the first code medium, link information for obtaining the first code medium or the code information corresponding to the first code medium, or a carrier for the first code medium or the code information or the link information, to a first background server or a second mobile terminal, or releases/to release the same to a place accessible to the first background server or the user of the second mobile terminal, for the first background server or the second mobile terminal to retrieve by themselves;

the first code medium received or the first code medium obtained by the obtaining unit is decoded by the first background server or the second mobile terminal via a decoding unit; the code information received or the code information obtained by the decoding unit is parsed by the first background server or the second mobile terminal via the code information parsing unit so as to extract corresponding service information and obtain the auxiliary information included therein;

the first background server or the second mobile terminal separately provides a service based on the extracted service information, or the first background server or the second mobile terminal provides a service through collaboration with any one or more of following collaborators: the first mobile terminal, the service providing device, one or more third party servers or one or more third party mobile terminals designated by the first mobile terminal, the service providing device, the first background server, or the second mobile terminal.

Optionally, the service providing device or the first mobile terminal collaborates in service providing via a d client software based on a parameter automatically substituted into the client software;

the parameter substituted into the client software comes from one or more sources below: corresponding code information for generating a first code medium, service information for generating the code information corresponding to the first code medium, code information obtained from decoding the first code medium, service information extracted from the parsed code information, and auxiliary information.

wherein the code information obtained by decoding the first code medium or the service information extracted after parsing the code information is obtained from decoding and parsing by a code information parsing unit respectively configured to the service providing device or the first mobile terminal, or obtained from decoding and parsing by a code information parsing unit respectively configured to the first background server or the second mobile terminal.

Optionally, the transmitting/receiving unit of the service providing device or the first mobile terminal provides auxiliary information to one or more of the following recipients at the time of generating the code medium or at any time point therebefore; or provides the auxiliary information to any one or more recipients below at the time of service providing or collaborating for service providing or at any time point therebefore;

the recipients include: a first background server, a second mobile terminal, a third party server, a third party mobile terminal, an operator system of the client software, and an operator system of the service providing device.

Optionally, the mobile terminal is provided with a presenting unit for presenting a first code medium generated by the mobile terminal or the service providing device for one or more times; the first background server, the second mobile terminal, the third party server, or the third party mobile terminal decodes and parses the presented first code medium to obtain one or more of the following interactive information:

service information;

intermediate information needed for service providing;

notification information for feeding back a service providing result;

identification information of any one or more of: the first mobile terminal, the service providing device, the first background server, the second mobile terminal, the third mobile terminal, the third party server, user of the first mobile terminal, user of the second mobile terminal, user of the third party mobile terminal, an operator of the first background server, or an operator of the third part server;

information correspondingly bound to the identification information of any one or more parties above, and attribute information corresponding to one or more of: the user of the first mobile terminal, the user of the service providing device, the first mobile terminal, or the service providing device.

Optionally, the service providing device is any one of a USB device, a memory card, a SIM card, an eSIM card, and a device having a wired or wireless communication interface, and the first mobile terminal connected thereto has a corresponding USB interface, a memory card slot or a memory card interface, a SIM card slot or SIM card interface, eSIM card integration interface, or a wired or wireless communication interface;

or, the service providing device is a combination of at least two components that are respectively connected to the first mobile terminal in same or different manners, wherein one component in the combination has a code information parsing unit, referring to any one in a first group including a USB device, a memory card, a SIM card, an eSIM card, and a device with a wired or wireless communication interface; the other component in the combination has a memory unit, referring to any one in a second group including a USB device, a memory card, a SIM card, an eSIM card, and a device with a wires or wireless communication interface;

or, the first mobile terminal is a standalone device or a combination of a plurality of devices, wherein at least one device of the plurality of devices in the first combination is a wearable device; and the service providing device connected to the first mobile terminal refers to a USB device, a memory card, a SIM card, an eSIM card, or a device with a wired or wireless communication interface;

or, the first mobile terminal is a combination of a body part and a plurality of external parts, wherein the presenting unit of the first mobile terminal is disposed in the body part or in the at least one external part; the service providing device refers to a USB device, a memory card, a SIM card, an eSIM card, or a device with a wired or wireless communication interface, which is connected to the body part of the mobile terminal or at least one externally connected part.

Optionally, the first mobile terminal is further provided with an acquiring module configured for acquiring attribute information corresponding to one or more of: the user of the first mobile terminal, the user of the service providing device, the first mobile terminal, or the service providing device, or configured for acquiring verification information provided by the user so as to check and compare the verification with the verification-comparison information pre-saved in the first mobile terminal, the service providing device, the first background server, or the second mobile terminal.

Compared with the prior art, the present disclosure has the subsequent beneficial effects:

The present disclosure needs no participation of any background server; services are provided independently by the service providing device in an offline state or provided through collaboration with a mobile terminal directly connected to the service providing device. The present disclosure also enables the service providing device or the mobile terminal to perform data interaction with the background server so as to expand more service providing solutions.

The present disclosure substantially does not require any adjustment to hardware such as the interfaces of the service providing device and the mobile terminal; sensing access of retrieving the code medium based on scanning of the two-dimensional code is implemented through conventional configurations of devices such as the mobile terminal; besides, the present disclosure requires no additional configuration of an external POS machine, such that its application scenarios will not be restricted, thereby rendering low cost for promotion and popularization.

By optionally retrieving, decoding, and parsing the code medium or optionally autonomously generating and presenting the code medium, the present disclosure may quickly and conveniently perform relevant operations such as mobile payment in the case of offline or online, which may also effectively avoid on-site leakage of important information such as account, thereby enhancing the security.

Compared with conventional two-dimensional code payment solutions, whose security measures mostly rely on the software program in the mobile terminal, the present disclosure leverages the service providing device independent of the mobile terminal to parse the code information corresponding to the code medium, and the important information (e.g., use information, account number, etc.) pre-saved in the service providing device is only retrieved when necessary; in this way, a layer of protection is added at the hardware level. Moreover, the present disclosure further requires first passing corresponding verifications such as password and biometric features when executing an important operation, which further guarantees the security.

By pre-registering with a designated background system (e.g., providing user information or payment account number, or providing information such as the account number bound to a mobile terminal or a service providing device), the present disclosure may avoid on-site display of relevant information in plain text, which may also avoid repeated submission of the information to a plurality of parties upon interaction.

The present disclosure may superimpose identification information of the target user in the information corresponding to the code medium based on a predetermined coding rule and decoding-parsing rule matching various parties so as to guarantee that only the target user may parse and know corresponding information, or only the target user performs collaboration in service providing to execute a designed operation, or only the target user obtains the service, etc.

The preferred embodiments of the present disclosure not only enable deduction from the pre-deposited amount in a prepaid card, but also enables a postpaid credit card mode in which the operations subsequent the payment are first executed, and then bill generating and payment settlement are subsequently performed based on the recorded order amount.

In the preferred embodiments of the present disclosure, a code information parsing unit (e.g., in a form of pre-installed APP program) is pre-installed in a memory device (e.g., an SD card), which, serving as a service providing device, has a relatively low cost in manufacturing and releasing. In the preferred embodiments of the present disclosure, with the SIM card as the service providing device, solves the account system-related issues in mobile payment, which may utilize the natural advantages of the real-name registration system and the SIM card account bound to the mobile phone number to make mobile payment and funds top-up so as to implement a prepaid card payment mode using prepaid call charge, or add the mobile payment amount to the postpaid bill of the mobile phone call charge; in the case of loss, it enables quick filing of loss and re-filing the SIM card; moreover, with use of the SIM card, it may further require access with mobile traffics for the interaction with the background system when executing important operations, thereby avoiding information hijacking upon networking with WiFi. With the SIM card as the service providing device, the carrier may dominate establishment of a "identity recognition+payment account system by the carrier," to expand more SIM card-based value-added services. As to other means such as an eSIM card integrated into the mobile terminal, they are mainly dominated by a terminal vendor, to similarly implement the mobile payment via an account number bound to the mobile phone.

The present disclosure enables transmitting of any interactive information by generating a new code medium. Various code mediums or their carriers obtained or generated by a certain user may be provided to other users by forward, duplication through photographing, or direct presentation on a screen, which may be obtained using a camera of a mobile terminal or a scanning gun; then, corresponding information may be retrieved by decoding and parsing.

DETAILED DESCRIPTION OF EMBODIMENTS

Hereinafter, the concept, specific structures, and achieved technical effects of a plurality of embodiments of the present disclosure will be further illustrated with reference to the accompanying drawings so as to sufficiently understand the objectives, features and effects of the present disclosure. Unless otherwise indicated to exclude corresponding features in the subsequent embodiments, relevant definitions, interaction procedures, and the features described in their varied examples in respective embodiment may all be applied to other embodiments.

Embodiment 1

Figure 1:
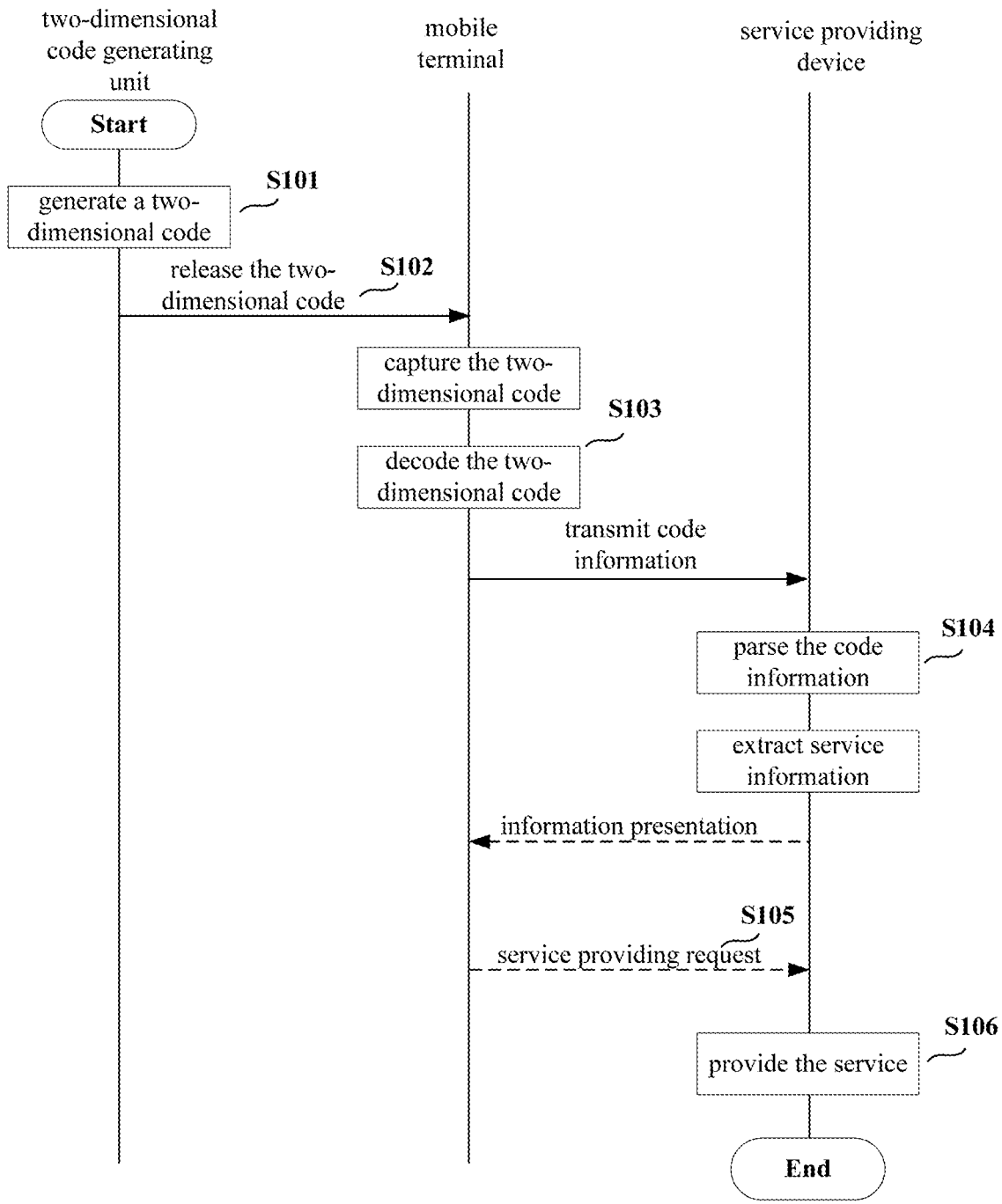
FIG. 1 shows a schematic diagram of an embodiment of service providing without network connection in the present disclosure.

As shown in the embodiment of FIG. 1, the mobile terminal and the service providing device are directly connected such that a system built may implement a service providing method below by applying active two-dimensional code scanning:

In step S101, a two-dimensional code generating unit generates a two-dimensional code according to a predetermined coding rule. For a service designed to be provided by the service providing device in this embodiment, the two-dimensional code generating unit generates code information corresponding to the service providing-related information (i.e., service information) according to a predetermined coding rule, and then generates a corresponding two-dimensional code for the code information.

In step S102, the two-dimensional code is released to a place where a user of the mobile terminal is accessible. For example, the two-dimensional code may be released on an Internet webpage or on an application software, e.g., Weibo, Wechat, QQ, etc., which may also be released on a plurality of information platforms such as a sales catalog, a TV shopping screen, a building advertisement media, a poster, a real store wall, an exhibition fare, etc.; alternatively, the two-dimensional code and/or a hyperlink corresponding to the two-dimensional code are directly sent to the mobile terminal.

The hyperlink corresponding to the two-dimensional code, information contained in which is identical to the information contained in the two-dimensional code, may be generated by the two-dimensional code generating unit based on the same predetermined coding rule. The hyperlink and the two-dimensional code may be displayed on a same page sent to the mobile terminal, respectively; or the hyperlink per se is invisible and attached to the two-dimensional code or attached to other media such as text, picture, video multi-media, etc. Then, the user may shoot the two-dimensional code or click the hyperlink (or click the two-dimensional code or propagation medium attached with the hyperlink) through the mobile terminal to extract the contained code information and further parse it to obtain the related information through a code information parsing unit of the service providing device. For example, to receive "a two-dimensional code in an image format without a hyperlink" in an APP having a code information parsing function in the mobile terminal/service providing device, by "long pressing" for recognition access to start "parsing the two-dimensional code by the code information parsing unit," the same access recognition effect may be achieved by "long pressing the two-dimensional code" in the mobile phone.

in step S103, the two-dimensional code is recognized and decoded by the mobile terminal to obtain the code information corresponding to the two-dimensional code. For example, the two-dimensional code is shot by a camera provided in the mobile terminal and then decoded by a hardware entity or software application built in the mobile terminal. The camera generally has 0.3 mega pixels or above, which may guarantee the definiteness of the two-dimensional code. When the camera targets at the two-dimensional code and the two-dimensional code is clear enough on the view-finding screen, the camera may automatically shoot the two-dimensional code.

In step S104, the code information parsing unit provided for the service providing device parses the decoded code information transmitted from the mobile terminal to extract corresponding service information. Optionally, after the parsing, the code information parsing unit may transmit a necessary content in the service information (or related to the service information) to the mobile terminal, which is presented on the display screen of the mobile terminal for the user to view, and/or waits for further confirmation by the user.

in step S105, the mobile terminal transmits a service providing request to the service providing device. The form, content, and transmitting manner of the service providing request are not limited; based on a specified operation procedure, the service providing request may be transmitted by the user via the mobile terminal or transmitted autonomously by the mobile terminal, or set to be default such that the service providing device directly executes the subsequent operation of service providing based on the operation procedure designated thereto.

The service providing request may include any information deemed by the service providing device as necessary for service providing. For example, it may be required to include, in the service providing request, the information uniquely identifying the mobile terminal, e.g., one or more of the SIM card number of the mobile terminal, the eSIM card number, the telephone number, the IMEI number of the mobile terminal, and the physical address of the interface of the mobile terminal, so as to identify the mobile terminal as a transmitter of the service providing request or a service recipient. However, as the service providing device and the mobile terminal are directly connected via an interface of the mobile terminal in this embodiment, it may not be required that the service providing request include the information uniquely identifying the mobile terminal. For example, in a preferred embodiment, it is default that the service providing device directly provides a service to the mobile terminal connected thereto.

In step S106, the service is provided to the mobile terminal via a service providing device. The present disclosure does not limit the form of the provided service and the manner of service providing. For example, for a content providing service, if enough content has been pre-saved in the service providing device, the service providing device may directly extract the content that is stored in the device and corresponds to the two-dimensional code to transmit to the mobile terminal based on recognition and parsing of the two-dimensional code. If enough content has been pre-saved in the mobile terminal, the service providing device may provide storage information of the two-dimensional code related information saved in the mobile terminal to user; or, the service providing device may start a hardware entity or an application in the mobile terminal to extract the two-dimensional code related content saved in the mobile terminal to the user. For another example, the service providing device starts an external device specified thereby or specified by the mobile terminal to extract the two-dimensional code related content in the mobile terminal or service providing device via an external device and provide it to the user.

Figure 2:
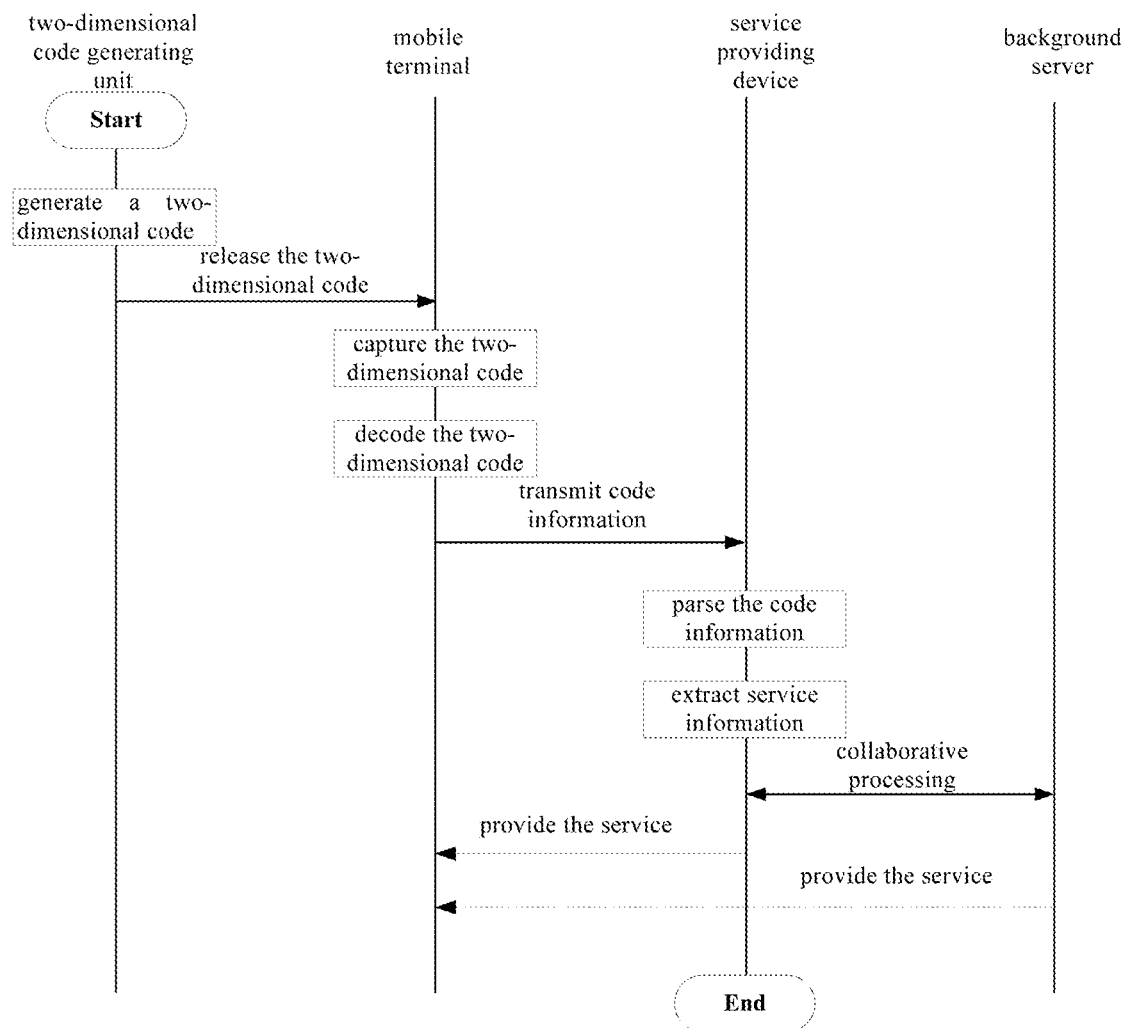
FIG. 2 shows a schematic diagram of an embodiment of service providing with collaboration from a background server in the present disclosure.

For a further example, for an order payment handling service, the service providing device may directly deduct an amount corresponding to the order from the pre-deposited amount in the device (see relevant deduction operation in FIG. 4), such that even without a network or the network signal is weak, the service providing device can still provide services at any time at any place, directly completing the whole payment operation without participation of other background server, which is equivalent to implementing local offline payment in a prepaid card mode. Or, the order payment phase may be separated from the payment settlement phase. The service providing device obtains a payment account number bound to the service providing device or the mobile terminal or the user, which is locally stored in the service providing device or obtained from the mobile terminal, and records the order information and the corresponding amount under the payment account (see the flows before the dotted-line blocks in FIG. 6); in this way, even there is no network or the network signal is poor, the payment operation can be still completed in a way similar to a postpaid credit card mode, i.e., allowing the service providing device to first carry out the processing procedures without payment, rather than immediately connecting the background server to obtain a result of confirming the order payment settlement.

all of the examples above indicate that service providing in the present disclosure may be implemented by the service providing device alone without participation of any background server. However, the services that can be provided via the service providing devices are not limited to the specifically illustrated examples. As shown in FIG. 2, the present disclosure does not exclude data interaction with the background server via the service providing device before, when, or after the service providing.

For example, for a content providing service, supposing that the service providing device does not locally store a specific two-dimensional code related content, but records a link address of the background server storing the related content, then the service providing device may directly retrieve the corresponding content from the background server based on recognition and parsing of the two-dimensional code and transmit it to the mobile terminal in the case of presence of network connection; if there is no network connection, the service providing device may optionally first transmit the link address to the mobile terminal, and wait till presence of the network connection such that the service providing device or the mobile terminal connects the background server to retrieve corresponding content.

Figure 6:
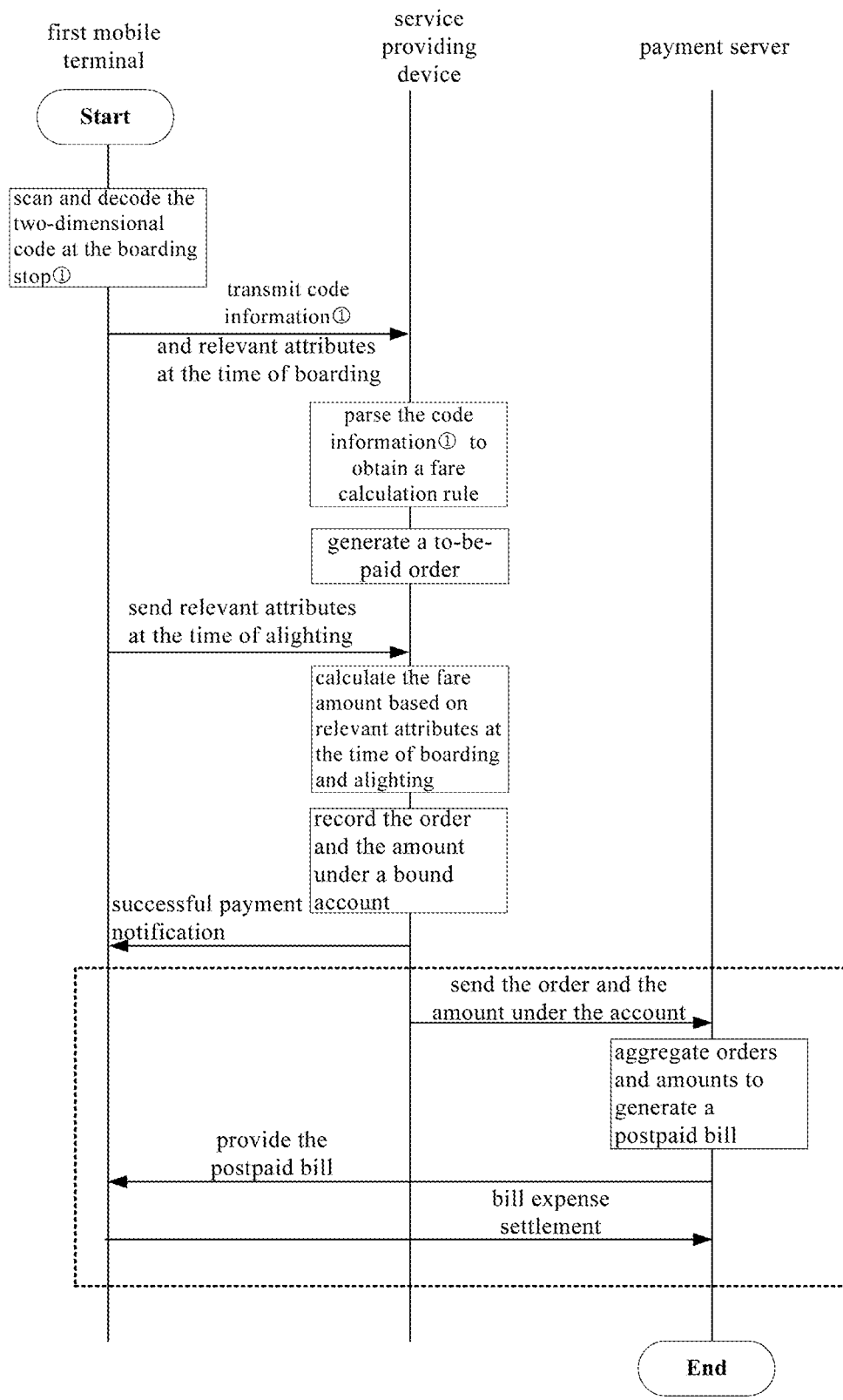
FIG. 6 shows a schematic diagram of an embodiment of service providing with collaboration between parsing code information and transmitting the information and a postpaid mode in the present disclosure.

For another example, as illustrated in the dotted-line blocks in FIG. 6, continued with the foregoing order payment handling service procedure, the service providing device may wait till presence of the network connection to transmit the order information and the corresponding amount in conjunction with necessary information such as the payment account number bound to the user to a background server (e.g., a payment server) collaborating to handle the bill issue; the payment server aggregates all of the order amounts under the payment account number to provide a later statistical query about the amount deducted by the device to the user in a prepaid card mode and provide a payment bill to the user in a postpaid credit card mode. Other subsequent operations, such as the user completing the transaction through various manners such as pay-upon-reception and online account transfer, or the payment server performing payment settlement with a background system of the vendor, will not be exhausted one by one.

Or, in another optional example of providing a payment order handling service, the mobile terminal or the service providing device may be asked to establish a connection with the payment server in real time based on the user-bound payment account number as set forth in the mobile terminal or service providing device, so as to submit the order information, and only after receiving the confirmation information from the payment server that relevant payment has been successfully paid to the vendor system, indicates a successful execution of the payment operation. Besides, optionally the service providing device or the mobile terminal connects other third-party server for collaborative processing, e.g., after completing payment of the products, connects to a logistic server to arrange for goods delivery, etc.

Embodiment 2

The present disclosure has no limitation to the form of the service providing device, and any device capable of implementing a set function (e.g., code parsing, connecting a mobile terminal via an interface to perform data interaction, storing various information such as funds/account number, etc.), where the set functions may be completed by one device or a plurality of devices respectively completing a part of set functions, cooperate with each other to perform the set function, is included in the scope of the present disclosure.

The present disclosure has no limitation to the form of the interface of the mobile terminal, which is only required to at least implement the connection for data interaction between the mobile terminal and the service providing device. For example, the interface of the mobile terminal according to the present disclosure may be various (preferably short-range) wireless communication interfaces such as a USB interface, a memory card slot, a SIM card slot, an infrared interface or a Bluetooth interface; the service providing device may be a device matching the corresponding interface, e.g., a USB device with a corresponding USB connector, a memory card such as an SD card, a SIM card, a device having a corresponding (near-range) wireless communication interface such as infrared or Bluetooth, etc. The service providing device may be constantly connected to the mobile terminal, or is normally carried by a user and only connected to the mobile terminal when it is needed to provide services, thereby providing a higher flexibility and autonomy.

In a specific example, the service providing device is a memory card. With an SD card as an example, a bank/insurance company embeds a business service packet into the SD card to be issued to the user; the SD card may parse the code information obtained from recognizing a payment collection two-dimensional code based on a code parsing rule in the business service packet, extract payment-related information such as the transaction price, the account number of the payment collector; it may also implement order offline payment handling in a prepaid card mode or postpaid credit card mode based on the pre-deposited amount or user band account number in the business service packet.

For another example, the SD card may set a digital certificate issued by the bank; for example, it is prescribed that only the SD card may be inserted into the slot, and only after the code information obtained from recognizing the payment collection two-dimensional code is parsed by the code information parsing unit built in the SD card to obtain payment related information, the user identity is confirmed through the digital certificate, and the association between the mobile terminal and the digital certificate is verified, can the payment in the prepaid card or the postpaid credit card mode be implemented (or, can the mobile terminal is allowed to establish a connection with the payment server based on the parsed payment related information so as to deduct the amount from the user's bank account). Currently, the manufacturing cost of the SD card becomes increasingly low; therefore, a new bank card issuing mode may be developed according to the examples of the present disclosure to expand new value-added businesses; a new (registered or unregistered) prepaid card may also be issued to the user.

In another specific example, the service providing device is a combination of a memory card (e.g., SD card) and a SIM card; the function of parsing the code information may be implemented by the code information parsing unit in the SD card to extract payment related information and indicate, based on the parsed service information, the SIM card to deduct the order related amount from the prepaid call charge, or indicate the operator of the mobile communication service to generate a corresponding postpaid bill. Usually, when applying for a new card at the operator, information such as the SIM card number and its corresponding mobile phone number has corresponding records, and real-name authentication of the user information also becomes increasingly mature; therefore, confirmation of the identity of the mobile terminal user may be completed based on the SIM card.

In a further specific example, the service providing device is a large-capacity SIM card, i.e., besides confirming the user identity and provide a deductible account number, the SIM card also has enough storage capacity to set the code information parsing unit to independently or collaborate with the mobile terminal to run some application, thereby implementing various functions independently performed by the SD card or jointly performed through the cooperation between the SD card and the SIM card in the above example. The current SIMAC card jointly developed by Tongfang Microelectronics, operators, and card vendors may be used as the large-capacity SIM card as it is based on THC80F10AC-model chip and has a GB-order card space, such that it may be connected to a mobile phone via 7816 and ICUSB interfaces, supports an application scenario where the mobile phone only has 7816 and SIM interfaces, and supports a plenty of SCWS (Smart Card Web Server) graphic applications and digital copyright applications.

For a service providing device which involves a SIM card, is bound to a user, and has a capability of external interaction and communication, it may be prescribed to compulsorily access the GSM network based on the SIM card to interact with the server (which may also use NB_IOT to perform identity verification based on a standalone channel so as to guarantee the security under a special payment scenario) when for example it is needed to connect an external server to assist in handling, without using WiFi communication via the mobile terminal. For another example, it may even be prescribed to directly receive the code information (e.g., in a form of hyperlink corresponding to the two-dimensional code) transmitted from the operator via SIM card access to the GSM network, such that the code information parsing unit extracts the corresponding service information after parsing based on a matching code parsing rule to execute operations of providing services to the mobile terminal and the like, without requiring the mobile terminal to scan the two-dimensional code to obtain code information.

The service providing according to the present disclosure substantially needs no adjustment of the current SD card and/or SIM card hardware or a mobile terminal interface in cooperation therewith, such that the cost for promotion and popularization is very low; besides, the offline payment operation may be implemented only by scanning, which is very convenient and has a wide array of applicable scenarios; further, it may effectively avoid leaking the band card number or password to the vendor on site or avoid the drawback that information transmitted to the background server via an unreliable wireless network is hijacked, thereby providing a higher security. Conventionally, loss of a mobile phone would cause an issue that the funds bound to the software account such as Alipay might be stolen by cracking the payment password; however, based on the system and method of the present disclosure, after the mobile phone is lost, the user may immediately file a loss with the communication operator to refile a SIM card; in this way, a layer of security protection for the funds and the account is added at the hardware level. Of course, the present disclosure has no limitation on the service functions that may be implemented by the SD card and/or the SIM card or the interaction between the mobile terminal proper and other background servers.

In addition, when it is needed to process important businesses with the SD card (or SIM card), or in the case of re-plugging or inserting the SD card (or SIM card) to a new mobile terminal, a verification mechanism may be provided to present misuse of the SD card (or SIM card) after being lost or stolen: for example, it is required that after the SD card is inserted into a new mobile terminal, the user enter a password for verification; the SD card compare the preset password stored in the card with the password entered from the mobile terminal (or, the SD card transmits the preset password to the mobile terminal or the background server to complete the specific comparison work), such that only the passwords match, will the SD card be allowed to execute a service providing operation such as payment. Besides the password, common verification manners, such as biometric feature recognitions such as fingerprint/voice print/retina (which likely requires the mobile terminal to set or be connected to an acquisition device for corresponding physiological features), identity verification and recognition manners, and connection to the background server to send a verification short message, etc., may all be applicable, which will not be exhausted here. the other kinds of service providing devices as mentioned above may implement the functions of the SD card/SIM card standalone or with mutual cooperation.

The service information according to the present disclosure may be any information related to service providing. For example, in an example of selling a certain product based on a two-dimensional code, the service information may include product information, e.g., product transaction related information such as product code, product category, regional GIS classification information, transaction price, sales organization, sales channel, rebate percentage, payment manner, receiving bank account number, third-party payment collection account number, and etc. Then, after parsing, necessary information (e.g., product name, transaction price, etc.) in the service information may be presented to the user; the service providing device or the mobile terminal may further obtain some other essential user information (e.g., payment manner, items purchases, address for receiving the product, etc.) related to the transaction from the mobile terminal or through interaction with the user. If the user is satisfied with the product and confirms the corresponding transaction information, a buy request may be sent to the service providing device via the mobile terminal to transmit the formed order (or transmit the transaction related information needed for the service providing device to form the order), such that the service providing device provides a corresponding order processing service.

Some attribute information of the mobile terminal may also be transmitted with the buy request. For example, the location information of the mobile terminal is obtained by a positioning unit (a GPS module or WiFi module, etc.) and provided to the service providing device to determine whether the mobile terminal is nearby a vendor, such that the service providing device may match corresponding discounts at different positions to process the order. To this end, the service information obtained from parsing by the service providing device should include a determining rule that different positions correspond to different discounts. Of course, the present disclosure makes no specific limitations to the determining rules and the attributes of the mobile terminal or user necessary for the determination.

Besides recognizing the information of the service requesting party or service receiving object in the service providing request above, or default in recognizing the information of the mobile terminal (which is connected to the service providing device), for example, recognition information of other third party (e.g., another mobile terminal, a certain background server, etc.) as the service receiving object may be transmitted with the service providing request; then the service providing device may provide services to a designated service receiving object based on the recognition information (e.g., executing a refinance processing for the order of another mobile terminal).

The prepaid card account number and the pre-deposited amount and the like of a consumer may all be embodied in a "prepaid card two-dimensional code" form (the information obtained from decoding and parsing the prepaid card two-dimensional code includes for example the prepaid amount, the coupon tickets including the number of consumption times, etc.); after the consumer purchases the card from or tops up to the operator of the prepaid card, the prepaid card two-dimensional code with updated parameters (capital amount or consumption times) may be provided by the operator. The prepaid card two-dimensional code may be independently issued or transmitted to the service providing device or mobile terminal and stored therein; or, the image of the prepaid card two-dimensional code may be pre-saved in the SD card and/or SIM; while the SD card and/or SIM card is directly issued by the operator to guarantee the convenience and security for use. Or, the mobile terminal, or the service providing device, or their respective designated two-dimensional code generating module may generate, based on the updated parameters provided by the operator, a prepaid card two-dimensional code with corresponding updated parameters.

In use, the consumer presents (or transmits or releases) the prepaid card two-dimensional code via the mobile terminal or service providing device, for a two-dimensional recognition device of others (e.g., vendors) to scan the code, which parses to obtain the corresponding parameter information based on a code parsing rule matching the predetermined rule and scans the code for verification. To prevent the prepaid card two-dimensional code from being usurped, it may be required that the consumer per shall confirm the payment operation on the mobile terminal before paying the amount. Or, the mobile terminal of the consumer may recognize the vendor's payment collection two-dimensional code to obtain the order information and payment collection account number, etc.; further, the mobile terminal or the service providing device may recognize its own prepaid card two-dimensional code and parse to obtain corresponding parameter information to perform the payment operation. Therefore, this kind of prepaid card two-dimensional code may be adapted to both active and passive code scanning manners.

This prepaid card two-dimensional code may be shared and gifted to other users by forwarding, photographing to duplicate, etc.; the "gifted/duplicated prepaid card two-dimensional code" may be identical to the original prepaid card two-dimensional code, or be a newly generated two-dimensional code; and in its corresponding service information, the payable amount may be further adjusted, or the recognition information of the original user and/or new user may be included (or information bound and associated with the recognition information, etc.), e.g., for limiting the object that may use the gifted/duplicated prepaid card two-dimensional code; if the new and old users are allowed to simultaneously use the prepaid card two-dimensional code and/or the gifted/duplicated prepaid card two-dimensional code, this mode is similar to the principal-supplemental card mode; for another example, the flow in the coding rule may be designed such that when the new user uses the gifted/duplicated prepaid card two-dimensional code to purchase, a notice is sent to the original user, or it may be further required to obtain the original user's consent to pay before deducting the order payment from the pre-deposited amount corresponding to the gifted/duplicated prepaid card two-dimensional code.

Based on the prepaid card two-dimensional code and the operations of gifting/duplicating, it may also be listed on a "digital assets exchange" or the like to realize "digitalized transfer transaction." For example, a pre-deposited amount or points originally based on a certain digital currency unit may be exchanged with other unit digital currency using a two-dimensional code management server connected to the "digital assets exchange" via the background, which is similar to the foreign exchange transaction; then, the pre-deposited amount in the original prepaid card two-dimensional code may shop across two-dimensional code serves at an exchanged proportion; this mode enables a transaction not only cross cities, but also cross countries.

Embodiment 3

Figure 3:
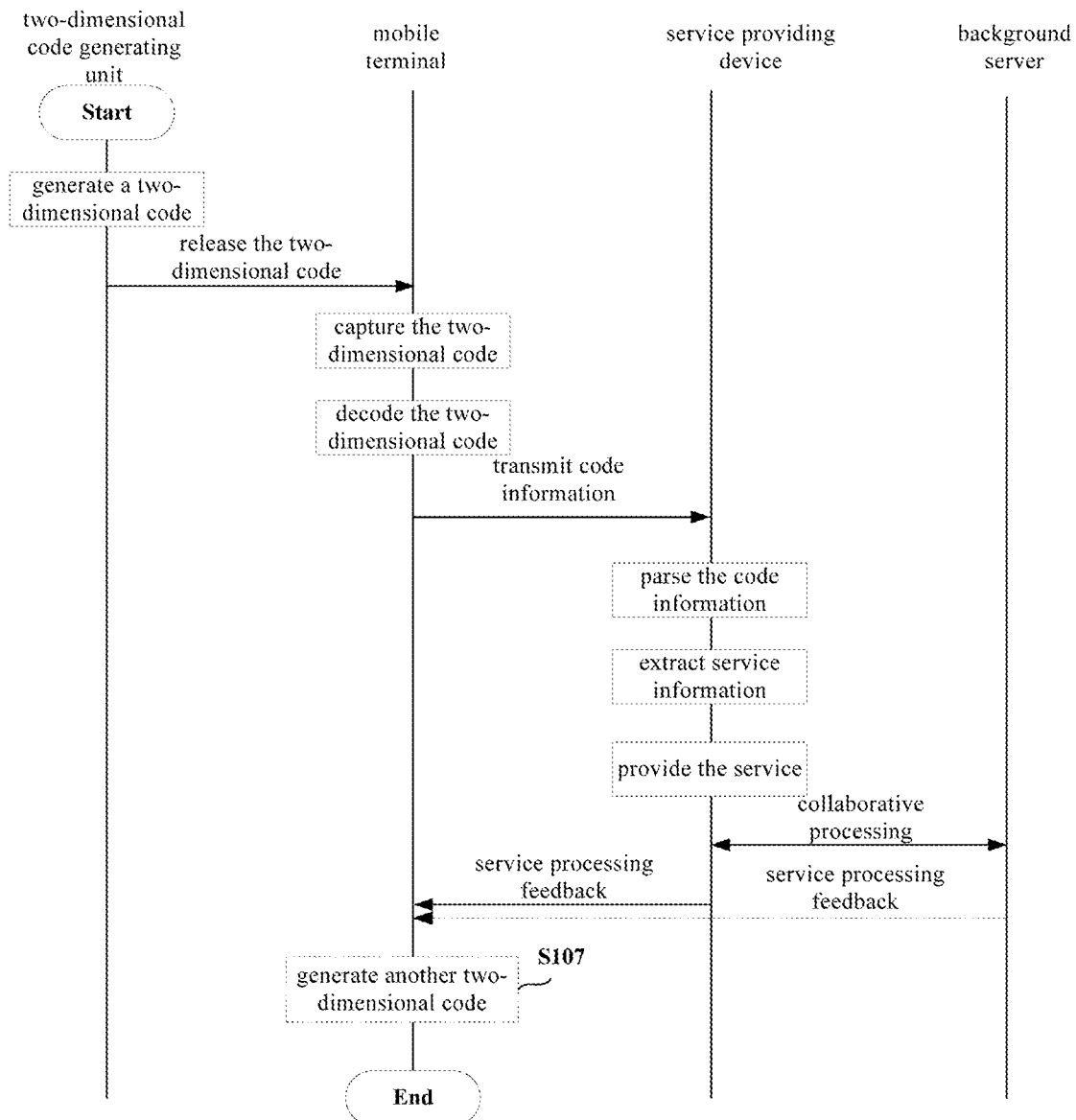
FIG. 3 shows a schematic diagram of an embodiment of newly generating a two-dimensional code based on feedback information in the present disclosure.

As shown in FIG. 3, in an optional step S107 continuing from the foregoing step S106, the service providing device may transmit a feedback message to the mobile terminal, e.g., a message notifying a successful service providing (successful charge payment, etc.) or a message notifying a failure (prompting insufficient balance, etc.). Or, if the service providing request includes the third party recognition information, it may also be required that the service providing device notify the feedback information to a designated third party (e.g., a payment server, a vendor's system, another mobile terminal, etc.).

In a preferred example of step S107, the notification of successful payment operation transmitted from the service providing device is superimposed with identification information of the mobile terminal (or service providing device), such that a two-dimensional code generating unit equipped to the service providing device or mobile terminal generates a second two-dimensional code, which may be displayed on the display screen of the mobile terminal, stored in the mobile terminal/service providing device, or forward to the third party (another mobile terminal, payment server), etc. Then, any other mobile terminal scans, recognizes, and parses the second two-dimensional code to obtain the notification information about the successful execution of the payment operation.

For example, in an example of implementing a function of paying a bus fare by a bus card, a two-dimensional code generating unit of a bus company generates a first two-dimensional code; the user starts the camera in the first mobile terminal to scan the first two-dimensional code at an entry of the bus; the connected service providing device parses the corresponding code information and directly deducts a bus fare of a fixed amount from the pre-deposited amount (in this case, the user needs not confirm the charge, and the service providing request may be in default); or the charge and the prepaid balance may be presented on the first mobile terminal before the deduction, and after the user clicks confirmation (as a service providing request), the service providing device deducts the charge. After the deduction, a notice of successful deduction and the balance may be presented on the screen; or, a two-dimensional code generating unit of the first mobile terminal or service providing device may further generate a second two-dimensional code as a payment voucher based on the notification information of successful deduction (whether to superimpose the identification information of the first and/or the second mobile terminal is optional); the second two-dimensional code may be forwarded to the mobile terminal of another user (i.e., the second mobile terminal). At the entry or exit of the bus, a two-dimensional code scanning device may be provided to scan the second two-dimensional code of the (first or second) mobile terminal, decode and parse to obtain a notification information that the fare has been paid; and then the two-dimensional code reading device controls the gate at the entry or exit to open to let pass the user whose mobile terminal has the second two-dimensional code. If the identification information of the first and/or second mobile terminal is superimposed on the second two-dimensional code, it may help the two-dimensional code reading device to distinguish whether the payment voucher has been used or determine whether the payment voucher matches the mobile terminal in use.

Figure 4:
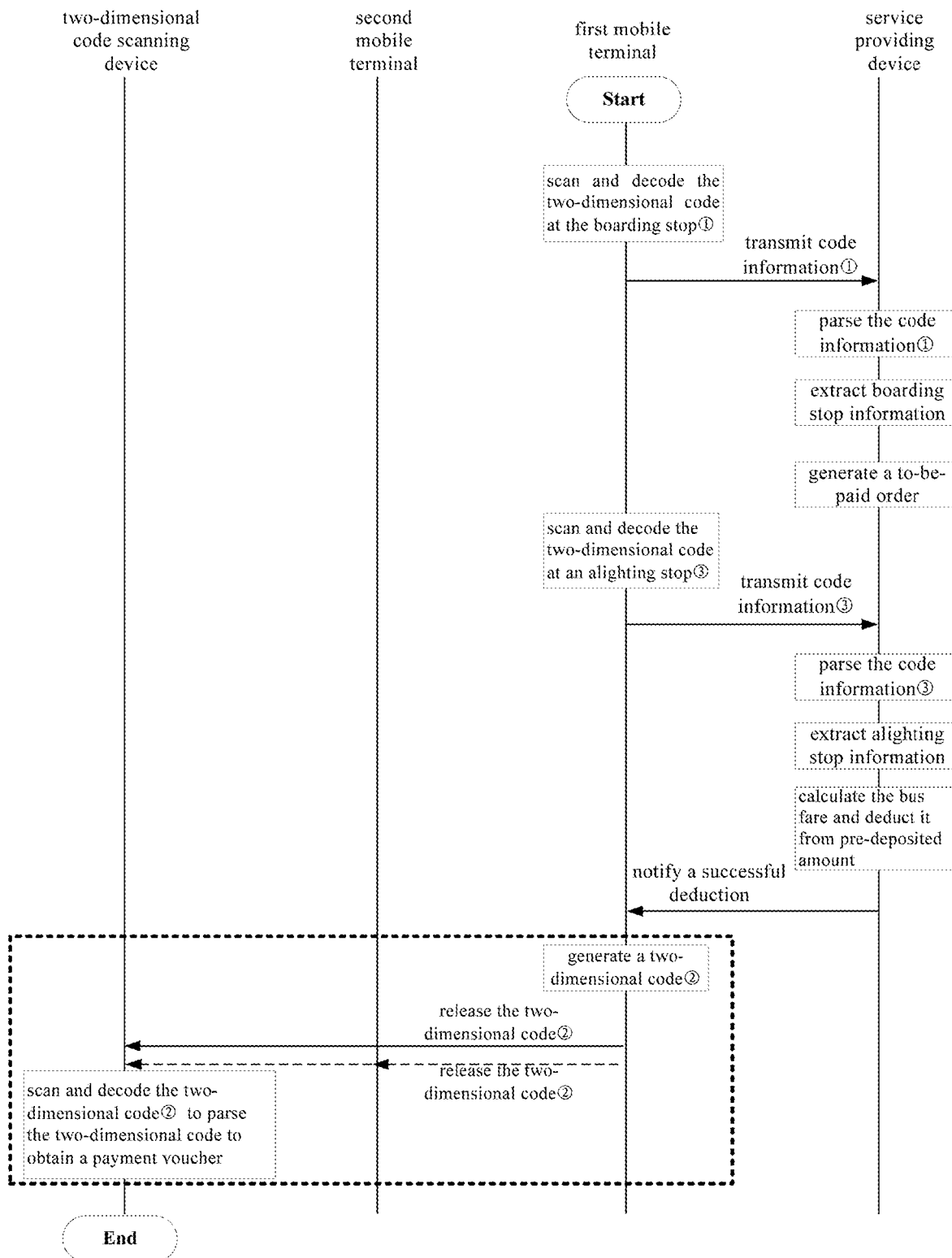
FIG. 4 shows a schematic diagram of an embodiment of scanning a two-dimensional code for multiple times to obtain complete service information and releasing a newly generated two-dimensional code in the present disclosure.
Figure 5:
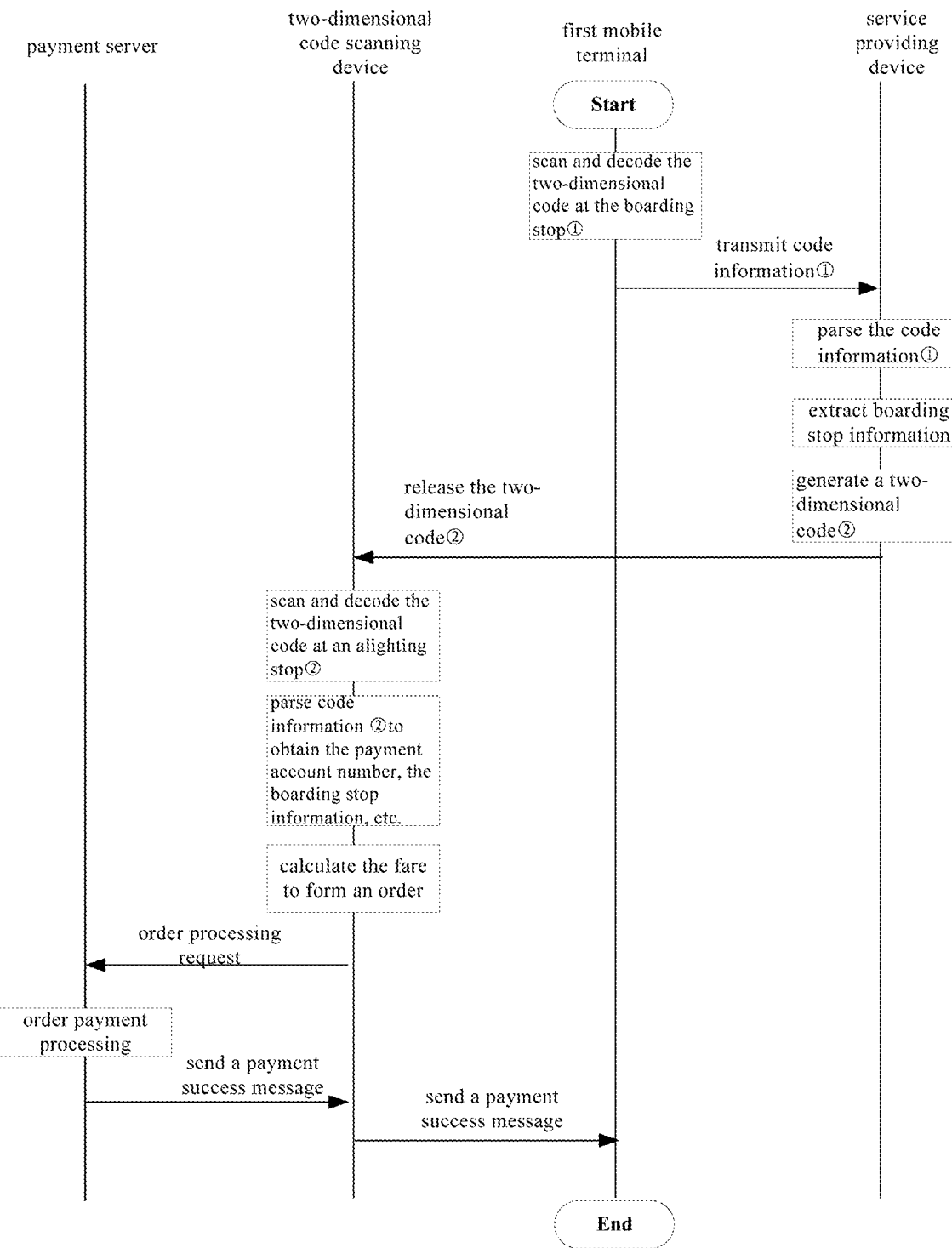
FIG. 5 shows a schematic diagram of an embodiment of newly generating a two-dimensional code to collaborate for service providing in the present disclosure.

In another example, supposing that the bus fare is not fixed, but increments by tiers based on the drive miles, as shown in FIG. 4, the first mobile terminal scans the first two-dimensional code at the entry of the boarding stop, the service providing device parses and extracts the boarding stop information corresponding to the first two-dimensional code and records it in a formed to-be-paid order; the first mobile terminal scans a third two-dimensional code issued by the bus stop at the exit of the alighting stop, the service providing device parses and extracts the corresponding alighting stop information, and based on the arrival bus top information and the boarding stop information in the to-be-paid order, the service providing device, alone or in collaboration with the mobile terminal, calculates a corresponding fare, and the service providing device executes the payment deduction operation (deduction from the pre-deposited amount or assisting in generating a postpaid bill). Or, as shown in FIG. 5, the first mobile terminal scans the first two-dimensional code at the entry of the boarding stop, the service providing device parses and extracts the corresponding boarding stop information, and then the two-dimensional code generating unit of the first mobile terminal or the service providing device submits the boarding stop information and the payment account information to generate the second two-dimensional code; the first mobile terminal scans the second two-dimensional code at the exit of the alighting stop to parse and obtain the boarding stop information as a basis for calculating the corresponding bus fare in conjunction with the boarding stop information, and then is connected the payment server background bound to the account to collect corresponding payment based on the user's payment account information to let the user pass. Or, as shown in FIG. 6, the first mobile terminal scans the first two-dimensional code at the entry of the boarding stop, the service providing device parses and extracts the corresponding boarding stop information therein, the service providing device, alone or in collaboration with the mobile terminal, calculates the corresponding bus fare based on for example the position change of the mobile terminal between the departure and alighting stops and time increase, the service providing device executes the processing operation of deductible payment, and then the two-dimensional code generating unit of the first mobile terminal or the service providing device generates a second two-dimensional code as a payment voucher, available for the device at the exit of the alighting stop to scan and let the user pass. For another, the service providing device may obtain information such as the deducted amount or times at the current month and calculates and deducts the discounted bus fare based on the preferential policy set by the bus company (the preferential policy may be covered in the parsing rule or covered in the service information obtained from parsing the first two-dimensional code).

Embodiment 4

The method of decoding the two-dimensional code or its hyperlink to obtain corresponding code information may be implemented with reference to any existing manner. As another implementation manner of step S103, the mobile terminal transmits the captured or received two-dimensional code to a background server in wired or wireless network connection thereto, and after the background server decodes the two-dimensional code, returns the decoded code information to the mobile terminal, such that the mobile terminal without a two-dimensional code canning recognition or decoding capability may also be applicable to the subsequent processing procedure of the present disclosure, thereby obtaining the service provided by the service providing device.

In a preferred example, the service information related to the service providing in the present disclosure at least includes a command for executing an operation procedure in which operations to be executed by the service providing device and the preconditions for the operations are prescribed; meanwhile, for various other parties involved in service providing (e.g., the user, mobile terminal, background server, etc.), their respective operations and preconditions executed in the operation flow in collaboration with the service providing are prescribed; the preconditions may refer to, when the operation flow is executed to a corresponding phase, achieving a result of an operation that needs to be executed by one party or more parties, or reaching some active conditions which may be adjusted based operations of respective parties and/or passive conditions (not affected by the operations of respective parties).

The present disclosure may cover the command of executing the operation flow above and other information (e.g., commodity information in the example) needed for service providing in the service information, and generate corresponding code information and two-dimensional code based on the preset coding rule. To this end, after the mobile terminal scans the two-dimensional code, the service providing device may know the operation flow in the service information by parsing the code information of the two-dimensional code based on a parsing rule matching the coding rule and then actuates the service providing device per se and various other parties to execute corresponding operations based on flow settings to thereby complete the service providing; a closed-loop transaction (an implication of is not limited to the so-called transaction in selling and buying a commodity) implemented as such causes a hacker without a matching code parsing rule hard to hack the closed-loop transaction process and avoids the information in the two-dimensional code from being tampered or intercepted, thereby effectively guaranteeing the security of transmitting information in the two-dimensional code.

In other words, the present disclosure may provide a convenient and efficient e-commerce service; the user is only required to access the two-dimensional code corresponding to the commodity or service; the simple action of shooting may trigger a series of subsequent operations, thereby implementing a full flow of complex e-commerce. Due to the extremely distribution scope of the two-dimensional code, the mobile flexibility of the mobile terminal, and the offline service of the service providing device, the user may very conveniently perform operations such as purchase and payment anywhere and anytime to obtain corresponding services. In the closed-loop transaction of the present disclosure, the code information corresponding to the information provided by the two-dimensional code transmitter, the code information actually corresponding to the two-dimensional code during the procedure of releasing and transmitting, and the information obtained from parsing, by the two-dimensional code receiving party, the code information in the two-dimensional code, follow a rule of uniformity among the three (the predetermined coding rule and the matching code parsing rule); as long as the three parties are not inflected by the same virus simultaneously, risk of leakage of important information such as the payment account number will not occur; only a device equipped with a matching code decoding rule can trigger, based on the service information obtained by parsing the code information of the two-dimensional code, a command therein which actuates the device per se or various other parties to execute the defined operation flow.

Figure 7:
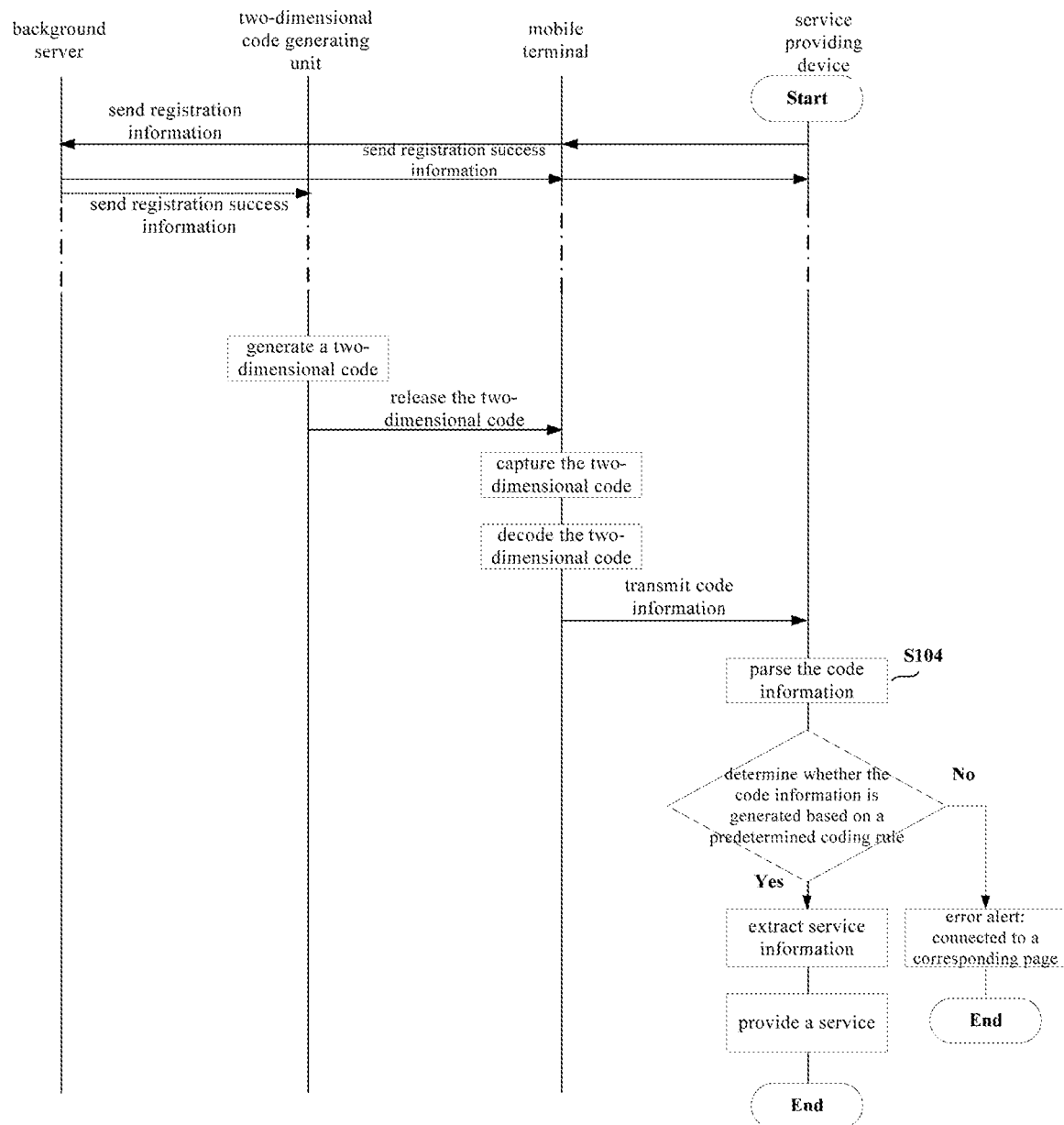
FIG. 7 shows a schematic diagram of an embodiment of user registration and parsing and determining a predetermined coding rule in the present disclosure.

Further in step S104 of a specific example, when the service providing device parses the code information, as illustrated in FIG. 7, it may first determine whether the two-dimensional code is generated based on a predetermined coding rule: if the two-dimensional code is generated based on the predetermined coding rule, subsequent steps of this method may be continuously executed (e.g., executing steps S104~S107 or embodiments of their various alterations); correct parsing indicates that the product information corresponding to the code information of the two-dimensional code s provided by the vendor releasing the two-dimensional code, the service represented by the service information corresponds to the service that may be actually provided by the service providing device, etc. Otherwise, if the two-dimensional code is not generated based on the predetermined coding rule, i.e., the code information of the two-dimensional code likely corresponds to the commodity information of another vendor or a service provided by another service providing device, then the service providing device may provide the subsequent information to the mobile terminal: for example, actual code information corresponding to the two-dimensional code, or a webpage link (corresponding to the commodity or service of another merchant) that may be linked to the actual code information of the two-dimensional code, or direct link to the webpage, or alarm of an error, or other preset webpage or indication information provided, subsequent steps of the method will not be continued to execute.

In a further preferred embodiment, to designate and accurately identify the executing party of the operation flow command in the service information, identification information of the executor may be further included in the service information: for example, the O2OBUY12345 included in the code information indicates that in the corresponding service information, the service providing device with an identification information O2OBUY is designated to execute the operation 12345 set in the operation flow; then, this example ensures that only after the service providing device O2OBUY correctly parses the code information, can the operation be performed based on the indication in the service information, while other service providing devices with different identification information cannot parse to obtain the corresponding service information (or the operation designated in the service information cannot be executed). It is seen that in this example, before formulating the coding rule or matching code parsing rule or generating the two-dimensional code, the identification information of the executing party (e.g., service providing device, or mobile terminal collaborating in service providing and its user, and various background servers, etc.) needs to be known so as to include the identification information in the code information corresponding to the two-dimensional code and the service information; therefore, the executing party needs to first pre-register with the operator of the two-dimensional code generating unit to provide identification information.

Additionally, in order to implement the order payment processing in the credit card mode above, it is required to at any time before executing the service providing step S106 (including before step S101) to implement registration of the user-bound account number to the payment server, such that the payment server may subsequently settle the payment with the user based on the recorded registration information. Further, in an example under the prepaid card mode, it may also be required to register the user with the provider of the service providing device at or before the first time of depositing an amount: for example, providing the identification information of the service providing device to the provider of the device (e.g., a bus company issuing the transportation card, serial number information of an unregistered transportation card recorded before selling of the card, etc.; the transportation card may serve as a service providing device to be wireless connected with a mobile terminal having an NFC identification module); for another example, the information of the user using the service providing device or the identification information of the mobile terminal connected to the service providing device may be provided to the provider of the device (e.g., user real-name information including the telephone number, SIM card number, name, and ID card as recorded by the communication carrier, the IMEI number or the physical address of the interface of the mobile terminal, etc.). Or, as needed, the identification information may be transmitted by the service providing device or the mobile terminal to the background server for registration before the service providing device or the mobile terminal submits transaction interaction with the background server as to the collaboration for handing the services.

The registration message described in various examples above for example include identification information which may uniquely identify the mobile terminal, the user, or the service providing device, and/or association information among the three; may further include other personal information such as the user name, the password, the address, the interests, the QQ number, and the payment account number, etc. Such registration information may be provided once for all or provided separately at different phases of the executed flow. The manners for the respective parties to submit their own registration information (or submit the registration information of their interacting parties) are not limited, e.g., the registration information may be transmitted via the communication module of the mobile terminal, the communication function (e.g., SIM card) of the service providing device, or other device (e.g., personal computer, etc.); the registration information may be transmitted separately or with other interaction requests over a wired or wireless network; the registration information may also be provided by signing a paper or electronic protocol. Or, the registration information may be obtained from another background server that has recorded the relevant registration information (e.g., the registration information may be transferred among the background system of the provider of the service providing device, the background system of the two-dimensional code generating unit, and the background server collaborating in processing the service providing), which may avoid repetitive submission of the personal information (particularly the important information such as the payment account number) to thereby effectively avoid risks. This mode naturally implements the payment tokenisation technology (which is a latest technology officially released by EMVCo in 2014, a principle of which is to perform transaction verification through a payment token in place of band card number, thereby avoiding the risks incurred by leakage of bank card number information).

Payment tokenisation is a process of using a unique numerical value in place of a conventional band card principal account number; meanwhile application of the value is restricted to a specific vendor, channel or device. The payment token may be applied in various nodes of a band card transaction. Like the conventional bank card number-based transactions, the payment tokenisation may be used in cross banks in the industry and thus has a universality: it may perform desentisation processing to information such as the bank card number, the valid term of the card, and the payment account of the payment institution, etc., and by setting domain-control attributes such as the times of transactions of the payment token, the transaction amount, the valid period, and the payment channel, etc., to control information leakage and fraudulent transaction risks from the source.

The two-dimensional code payment mode according to the present disclosure may implement the "payment tokenisation" through formulating a coding rule. In the system of the present disclosure, the payment includes two parts: "identity verification" and "account system," while the uniquely identified "device number" may serve as an important "ID of digital person" of the "payment tokenisation verification" (as a hardware-based ID verification, its security is higher than pure software-based), while to implement funds transfer cross account systems by code scanning, particularly the two-dimensional code for payment by active code scanning may include information about "payment scenario" and identity verification. The "digital person" above may be understood as an integration of a natural person in the real world with a device that is equipped to the person and enables digitalized sensing access (for example, a mobile terminal and a service providing device which implement recognition and parsing of the code). The digitalized sensing accessed device imparts digitalized properties to the entity person. The digital person has an identifiable digital person token (ID of the digital person), which may be device information and/or user identity information, or a binding of the user identity information to the device information; the digital person symbol may be unique within a specific range. Any behavioral operation executed by the digital person may be identified and recorded by an authorized agency based on the identifiable digital person.

An offline prepaid card discount card solution containing a payment token (originated from the local service providing device) is provided below: a customer recognizes a source two-dimensional code released by a vendor through a mobile terminal at an offline store, and the mobile terminal decodes and parses the source two-dimensional code to obtain a service and then enters a promotion page where the product can be shared; or, the customer directly opens the vendor's App or opens a universal payment App. At the promotion page or in the opened App, the customer clicks a payment code button, such that a local service providing device containing the code issuing standard rule of the safety payment code issuing center may obtain a dynamically payment code (Hash value) containing the payment token, which Hash value corresponds to the customer's prepaid card information (e.g., card number, pre-deposited amount, etc.) embedded in the local service providing device; the customer may also buy the vendor's membership card at the site and further adds the membership card information in the content corresponding to the Hash value to thereby obtain a discount qualification. A shop assistant scans the Hash value presented on the customer's mobile terminal via a corresponding recognition device to obtain information about the prepaid card/membership card to complete a secure and high-value payment. The promotion page may be forwarded and shared; as what is forwarded is not the source two-dimensional code, the customer's prepaid card function may be shielded from others. Another customer who receives the forwarded promotion page may likely go to the offline store to scan the source two-dimensional code to access or open the corresponding App and otherwise initiate an invoking of the abovementioned payment-related logic. Of course, the "hash value of payment token" may also be obtained from the "server end of the secure payment center" over a wireless communication connection based on the mobile terminal's "code parsing rule." The "payment token" in the local service providing device (e.g., SD card) may implement a "high-value check" "designated scenario" application service function like the prepaid card.

The code information parsing unit of the service providing device according to the present disclosure may be an application (App) for implementing code information parsing based on a matching code parsing rule or a hardware device embedded with the application. It may be prescribed that the service providing device, the mobile terminal, and another third party application device cannot autonomously modify the code information parsing unit or the code parsing rule therein; instead, only the provider of the service providing device may perform installation or update, or the installation or modification can only be performed after obtaining authorization of the provider.

Embodiment 5

In the present disclosure, a client software may be configured for the mobile terminal so as to provide an interface for human-machine interaction, presenting various prompts and notifications sent for example by the service providing device and the mobile terminal to the user, receive a confirmation indication sent by the user, and fill in various information, etc.; or facilitate the user to obtain a service provided by the service providing device (or its collaboration with the mobile terminal and the background server, etc.).

Figure 8:
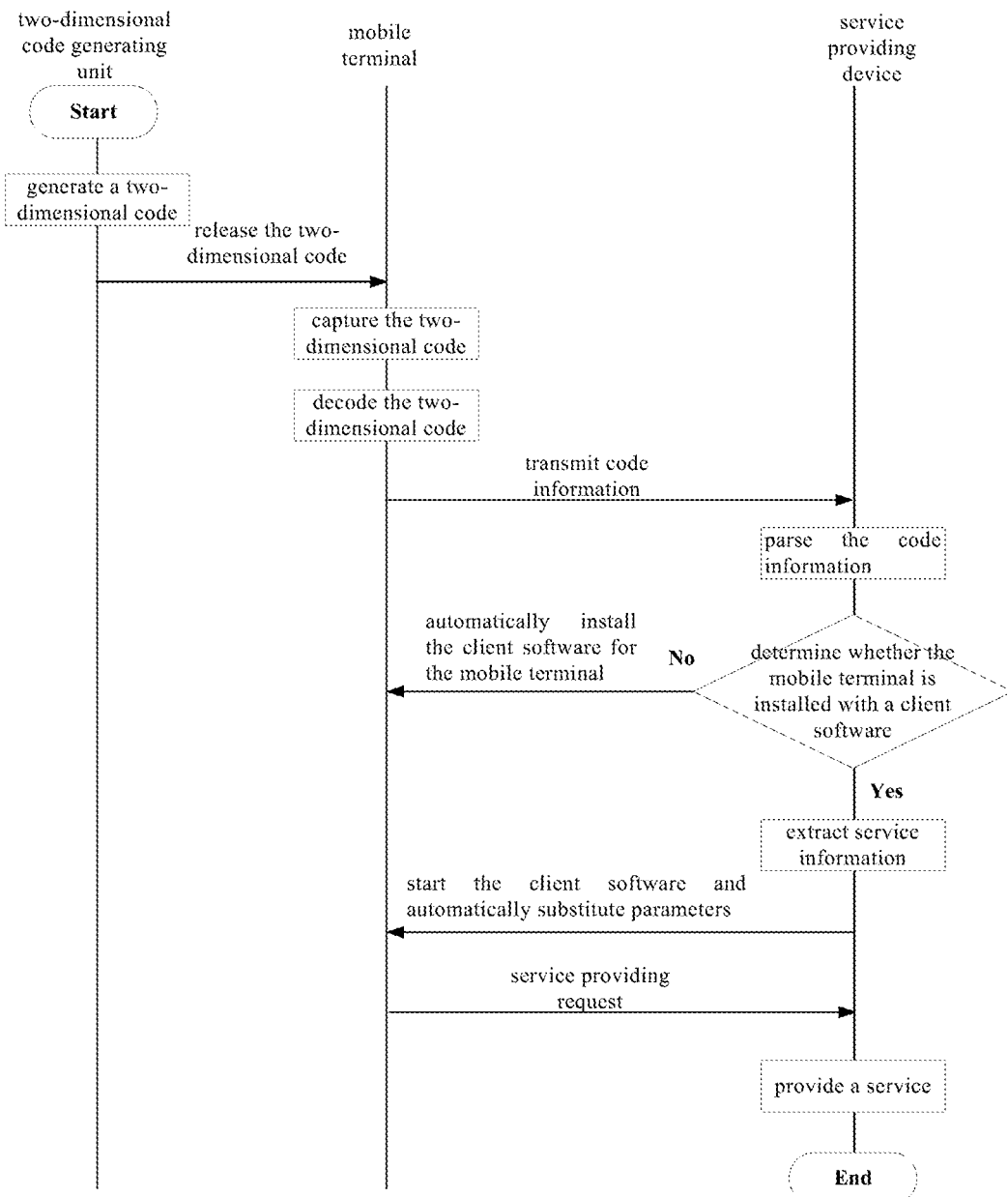
FIG. 8 shows a schematic diagram of an embodiment of automatically monitoring and installing a client software in the present disclosure.
Figure 9:
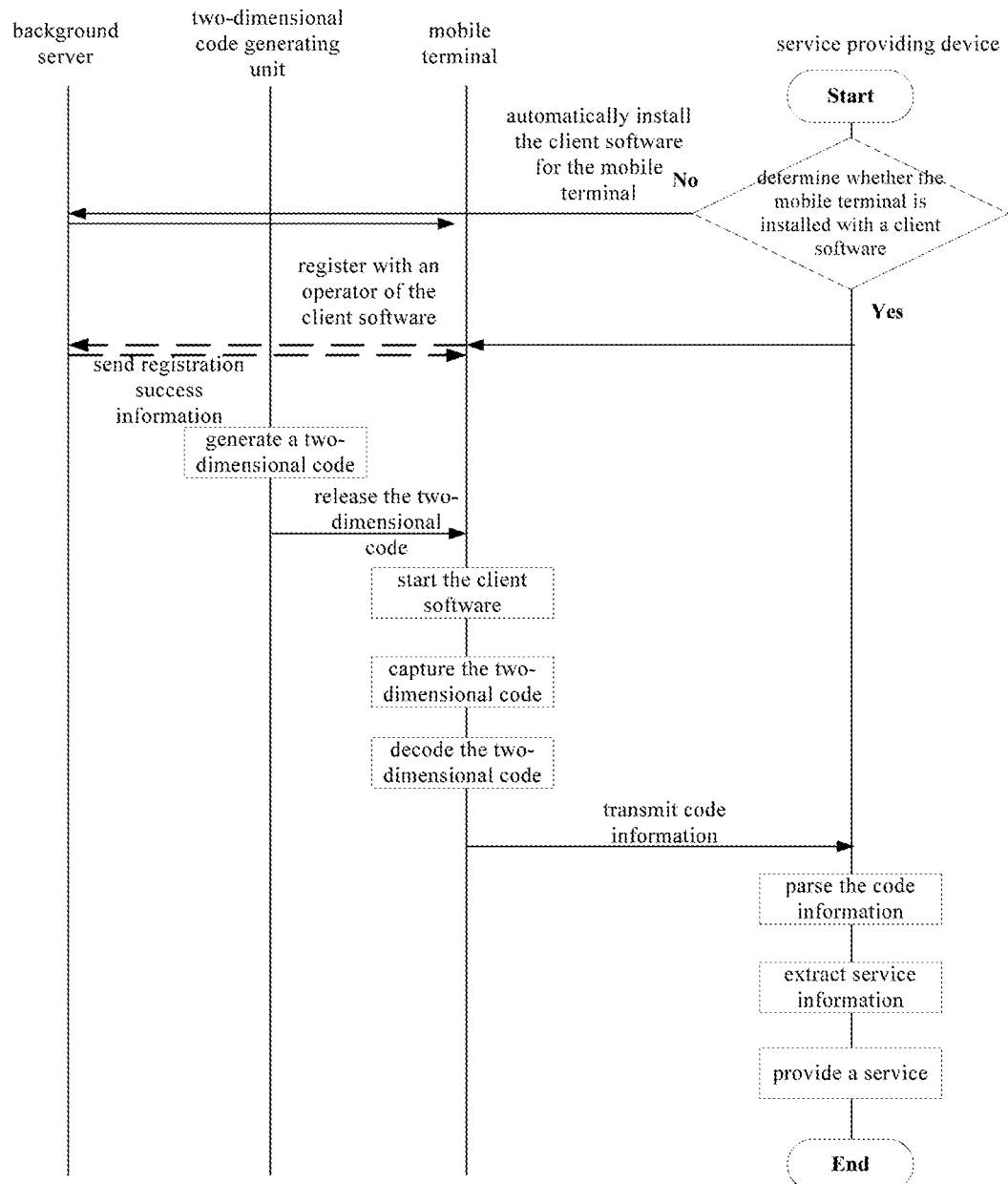
FIG. 9 shows a schematic diagram of an embodiment of actuating a camera to scan a code by a client software in the present disclosure.

As illustrated in FIGS. 8 and 9, when the user views the released two-dimensional code, the camera may be awaken by the client software to scan; the client software sends the decoded code information to the service providing device and the service providing device receives and automatically substitutes a relevant parameter in the parsed service information (the relevant parameter is configured for actuating the mobile terminal to execute a collaborative operation command, and/or for indicating the information presented to the user) so as to continue executing a relevant flow of the service providing method of the present disclosure. Or, regardless of whether the client software has been installed, the mobile terminal may directly start a universal camera to scan the two-dimensional code; after the service providing device parses to obtain the service information, it automatically starts an appropriate client software in the mobile terminal based on relevant parameters in the service information and substitutes the relevant parameter obtained by parsing the service information in the client software to continue executing relevant procedures.

In a preferred embodiment of the present disclosure, the two-dimensional code decoding unit is embedded in the hardware entity of the mobile terminal, such that even the mobile terminal is not installed with the client software, it may still shoot and decode the two-dimensional code and submit it to the service providing device to parse. Optionally, if the service providing device fails to parse the code information of the two-dimensional code, the client software may prompt an error alarm to the user, alert the user to scan a correct two-dimensional code, and present a page linked to the actual code information of the two-dimensional code or present the link, etc. Besides, for code information of the two-dimensional code which cannot be successfully parsed, the service providing device may also be connected to a background server to update the code information parsing unit or request the background server to parse and return a parsing result.

The client software that may substitute relevant parsed parameters may be associated with the code information parsing unit of the service providing device, e.g., knowing a predetermined coding rule or matched code parsing rule, or may further run based on the rule to implement set operations. At any time point before the parsing process, if the service providing device determines that the client software is not installed in the mobile terminal, the client software installation packet stored in the service providing device or the link address for downloading the client software may be sent to the mobile terminal, or after the installation packet is downloaded from the background server of the client software operator based on the link address, it is sent to the mobile terminal and automatically installed. The background server (or a third party associated therewith) of the operator of the client software may likewise determine whether the client software is installed in the mobile terminal. The service providing device or the background server may monitor, by setting a client software monitoring unit, a list of installed software in the mobile terminal to determine whether the client software has been installed and determine whether participation of the client software installing unit is needed; the client software installing unit may provide an client software automatic download and install services to the mobile terminal when it monitors and determines that the client software is not installed, which needs no manual operation of the user of the mobile terminal, thereby enhancing the satisfactory degree of the user experience.

Based on actual application scenarios, the user, the mobile terminal, or the service providing device may be required to provide registration information to the operator of the client software in advance according to any manner mentioned above; if necessary, the background system of the operator may communicate various service providing-related information such as the registration information with other background servers, such as the background system of the provider of the service providing device, the background system of the two-dimensional code generating unit, and the background server collaborating in handling service providing.

Embodiment 6

Besides the two-dimensional code, the service providing method of the present disclosure may also be implemented based on other forms of code mediums. The code mediums may be barcode images such as one-dimensional code, two-dimensional code, multi-dimensional code, which are visible to naked eyes, or an optical lattice diagram which expresses the code information and is drawn with a fluorescent pen and represented in various forms such as: light-shadow rays, visible light, UV light or infrared light, polarized light, refurbish frequency, etc., or a digitalized acoustic represented with a specific rule/frequency change, as long as the code medium may completely store the code information corresponding to the information that needs to be sent. Although the one-dimensional code has a limited storage information amount, it is also feasible theoretically. The optical lattice diagram is generally designed to be unidentifiable or hardly identifiable to naked eyes, and the digitalized acoustic waves are generally designed to be hardly identifiable by human ears. However, the present disclosure is not limited thereto; when necessary, they may be made visible to naked eyes/audible to human ears.

The mobile terminal in the present disclosure may be a mobile phone, a tablet computer, a personal computer, or a wearable device; when the service providing device is a SIM card, it may also refer to an eSIM card in a wearable device. The wearable device refers to, but not limited to, various human body wearable parts such as a portion (e.g., for arranging a flexible information display and input screen) of accessories, eyewarees, eyeware clips, headwear, hats, tie clips, brooches, bow ties, bracelets, watches, earphones, clothing, shoes. A user may be simultaneously equipped with one or more wearable devices. The service providing device may also be embedded in a certain wearable device.

Figure 10:
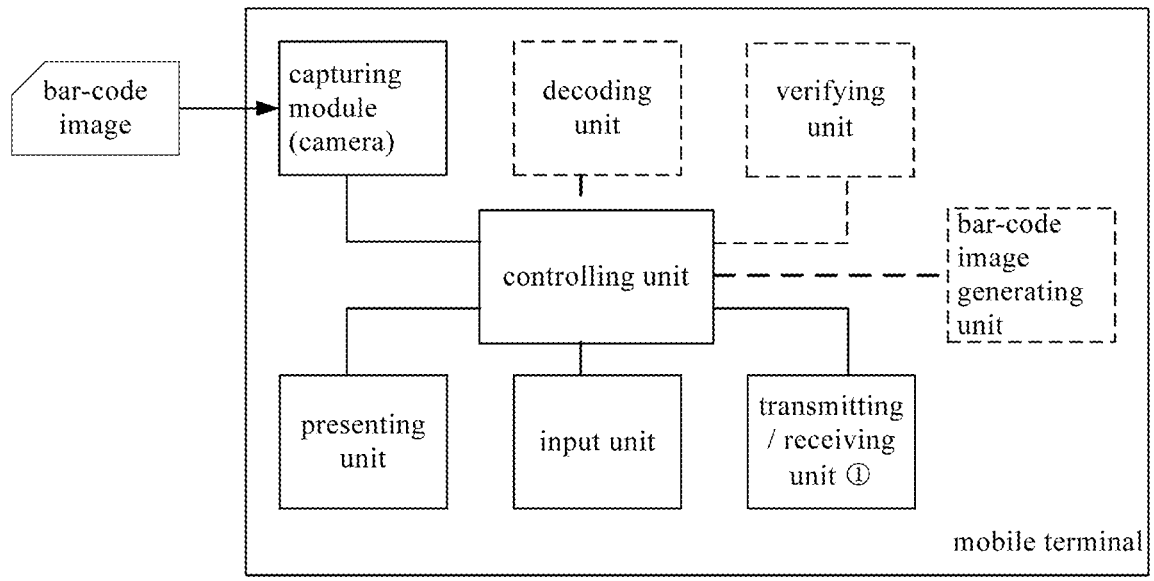
FIG. 10 is a structural schematic diagram of an embodiment of a mobile terminal in the present disclosure.

As shown in FIG. 10, an exemplary mobile terminal according to the present disclosure has at least one interface as mentioned above to be connected to a service providing device; the mobile terminal further comprises the subsequent functional modules:
- an obtaining module for obtaining a code medium; for example, a camera that captures a visible barcode image; or a personal computer, which may be connected to a barcode recognition device such as a code scanning gun to scan a bar code image even without a camera; or a corresponding type of obtaining module which receives the optical lattice diagram or a digitalized acoustic wave, etc.;
- a decoding unit configured for decoding the obtained code medium to obtain code information;
- a transmitting/receiving unit configured for interacting information with a service providing device (or further with various kinds of background servers, or functional modules of the mobile terminal scattered in other mobile terminals), or for implementing forwarding of the interactive information between the service providing device and the background server, etc. so as to receive the service or collaborate in service providing; for transmitting and receiving any information mentioned in various examples above, e.g., transmitting registration information or receiving registration success information, transmitting code information or receiving parsed service information, transmitting a service providing request, and transmitting or receiving various feedback notifications during the service providing process, etc.;
- an input unit configured for entering input information involved in an interaction process; and
- a presenting unit configured for presenting various information involved during the interaction process; information presenting may also be implemented by providing an external screen or projector, wherein the manners of information presenting are not limited.

In some examples, the mobile terminal may further comprise a code medium generating unit for generating another code medium, for example, causing the code information of another code medium to correspondingly include a voucher notification of successful service providing or receiving, identification information of the mobile terminal or the third party it designates, etc. The code medium obtained by the mobile terminal or another code medium generated may be transmitted to a further mobile terminal or a further background via the transmitting/receiving unit.

When the mobile terminal uses wearable devices, the various functional modules as above mentioned may be integrated into the same wearable device or scattered in a plurality of wearable devices or scattered in a plurality of devices such as the wearable device and the mobile phone.

In some other examples, the decoding unit as a software program or hardware entity may be arranged external to the mobile terminal or arranged in an external device such as the service providing device and the background server; the mobile terminal transmits the obtained code medium to these external devices for recognition, and decoded code information is returned to the mobile terminal.

Figure 11:
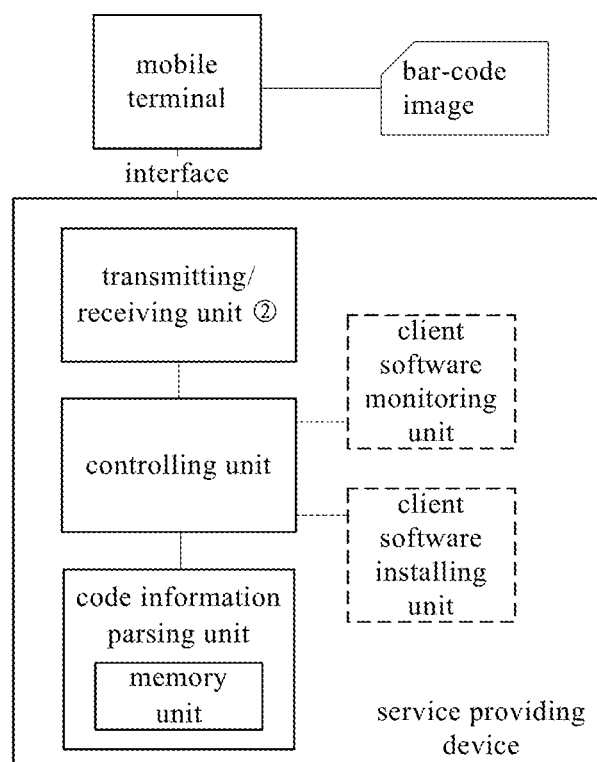
FIG. 11 is a schematic diagram of a service providing device and a connection relationship in one embodiment of the present disclosure.

As shown in FIG. 11, the service providing device connected to the interface of the mobile terminal comprises the subsequent functional modules:
- a second transmitting/receiving unit configured for interactive information with the mobile terminal (or further with various background servers, etc.), which may also implement forwarding of the interactive information between the mobile terminal and the background server and transmit/receive any information mentioned in various examples above;
- a code information parsing unit configured for parsing the code information, which may first determine whether the code medium is generated according to a predetermined coding rule: if the code medium is generated according to the predetermined coding rule and the stored code parsing rule matches the actual coding rule of the code medium, the code information parsing unit may successfully parse the code information and then extract the service information corresponding to the code information; if the code medium is not generated based on a predetermined coding rule and the code parsing rule does not match the actual coding rule of the code medium, a control command below may be generated: controlling the mobile terminal or service providing device to perform network connection and open a browser, etc., such that the mobile terminal may be directly linked to the webpage (corresponding to a product or service of another vendor) to which the actual code information of the two-dimensional code is directed, or controlling a presenting unit of the mobile terminal to provide a link to the webpage or prompt an error alarm, or provide a preset other webpage or alert information, or make no alert, etc.
- a memory unit which may be a standalone unit, or a component of a code information parsing unit, configured for storing various information data, e.g., pre-storing a code parsing rule, essential information (pre-deposited amount, payment account number) for service providing, installation packet or download link of a client software that may provide human-machine interface and/or substitute the service related parameters, and identification information of the mobile terminal or user stored during the interaction, etc.

The service providing device may be further equipped with: a client software monitoring unit configured for monitoring whether the mobile terminal is installed with a corresponding client software, and a client software installing unit configured for automatically providing download and installation of the client software for the mobile terminal when it is monitored that the mobile terminal is not installed with the client software. Preferably, if the code medium is generated based on a predetermined coding rule, the installed client software may be quickly started through interaction between the first and second transmitting/receiving units, and the parameters obtained from parsing the code information may be automatically substituted into the client software, without a need of user operation.

The mobile terminal or the service providing device may further comprise a verification unit. When the service providing device is performing an important operation or is reconnected with the mobile terminal, to implement the foregoing different verification manners, the verifying unit may be connected to corresponding units in the mobile terminal, service providing device or external device: for example, to perform password verification, it is needed to connect the input unit of the mobile terminal to obtain the password entered by the user, connected to the code information parsing unit or memory unit in the service providing device to retrieve a preset password; for example, connected to a biometric feature acquiring device to acquire information such as fingerprint/voice print/retina, etc.; for another example, connected to the transmitting/receiving unit to implement interaction with the background server, transmit/receive a verification message, and information related to a problem in identity recognition, etc.

Besides, various kinds of background servers (e.g., the background server of the provider of the service providing device, the background server of the two-dimensional code generating and issuing mechanism, the background server provided for collaboratively handling the services) are respectively configured with a transmitting/receiving unit to interact with the mobile terminal or the service providing device; moreover, based on the functions respectively implemented thereby, corresponding functional modules are configured, e.g., a database for storing registration information (identification information) of the mobile terminal or user, a registering unit for completing user registration, and a two-dimensional code generating unit, etc., which are not exhausted one by one here.

Embodiment 7

Figure 12:
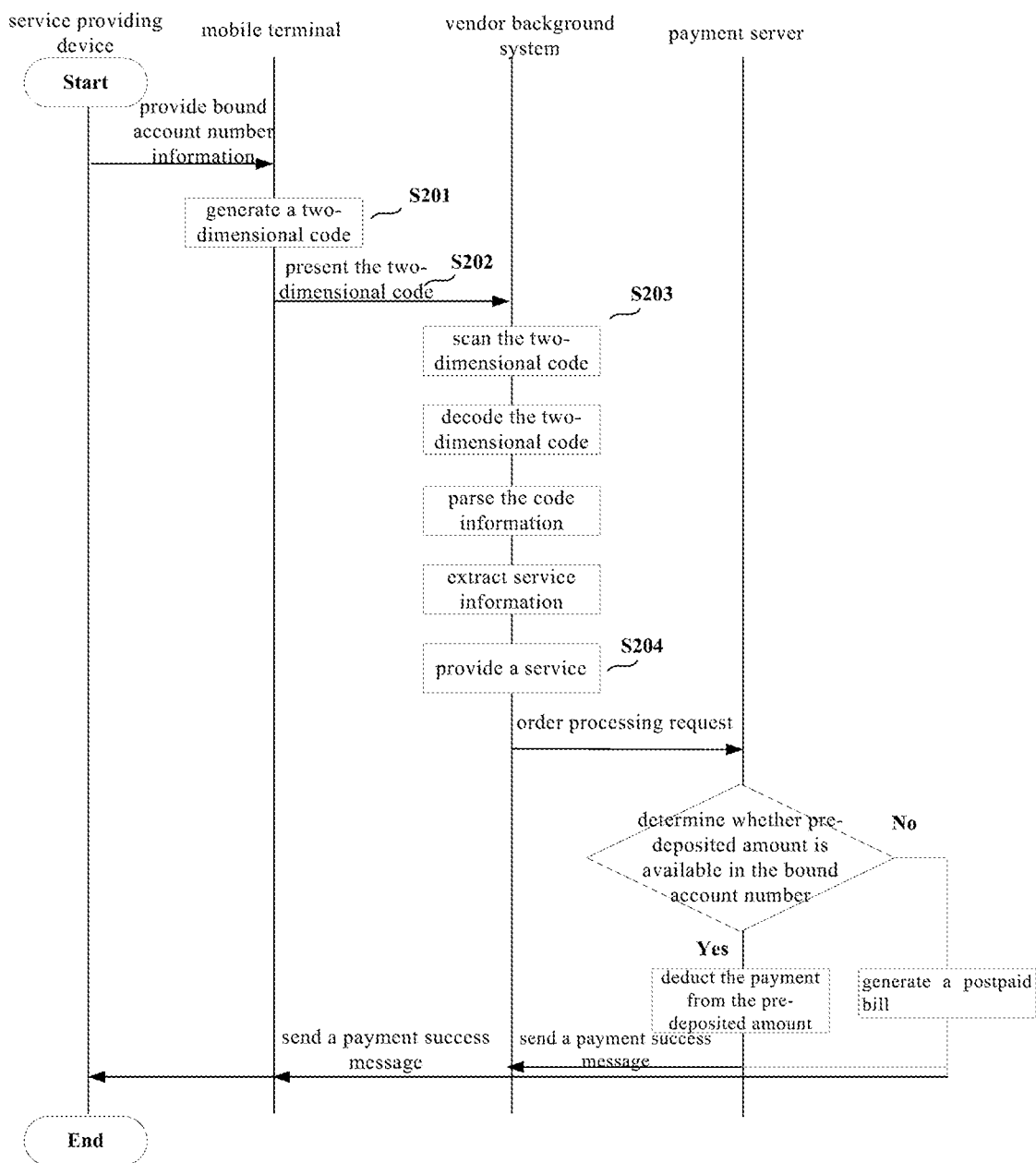
FIG. 12 shows a schematic diagram of an embodiment of passive code in the present disclosure.

As shown in the embodiment of FIG. 12, the mobile terminal and the service providing device are directly connected via any interface mentioned above such that a service providing method below may be implemented by applying passive two-dimensional code scanning:

in step S201, the two-dimensional code generating unit of the mobile terminal or the service providing device generates code information corresponding to the service providing related information (service information) according to a predetermined coding rule, and the generates a two-dimensional code corresponding to the code information.

In step S202, the two-dimensional code is displayed at a presenting unit such as a display screen of the mobile terminal, available for the user and the vendor to view. Or, the two-dimensional code or its hyperlink or its corresponding code information may be directly transmitted to the vendor's background system.

In step S203, the vendor's background system (first background server) recognizes the two-dimensional code presented by the user's mobile terminal via a two-dimensional code recognizing device (e.g., a scanning gun, or another mobile terminal with a camera or camera head); and service information corresponding to the two-dimensional code information is obtained by decoding by the decoder and then parsing by the code information parsing unit (for the code information corresponding to the directly received two-dimensional code, it may also be parsed by a code information parsing unit).

a code information parsing unit of the vendor's background system may first determine whether the code medium is generated according to a predetermined coding rule: if the code medium is generated according to the predetermined coding rule and the stored code parsing rule matches the actual coding rule of the code medium, the code information parsing unit may successfully parse the code information and then extract the service information corresponding to the code information; if the code medium is not generated based on a predetermined coding rule and the code parsing rule does not match the actual coding rule of the code medium, an error alarm may be promoted to the user's mobile terminal to require re-generating the two-dimensional code or other set prompt information or page according to the predetermined coding rule; afterwards, the method of this embodiment will not be further performed.

in step S204, the vendor's background system provides a service based on the parsed service information.

To provide the service or collaborate in providing the service, the service information in this embodiment may include any necessary information that the vendor's background system needs to obtain from the mobile terminal and/or the service providing device. For example, to implement a payment order processing for a product purchased, the parsed service information may include the payment account number bound to the user, and identification information of the user/mobile terminal/service providing device, etc. Particularly, the payment account number bound to the user preferably comes from a service providing device, e.g., a payment account number stored in the SD card or SIM card, or account number information bound to unique identification information (e.g., SIM card number, mobile phone number, etc.) of the SIM card.

If the payment account number bound to the user has pre-deposited amount in the service providing device, the vendor's background system may directly deduct from the pre-deposited amount; if there are no pre-deposited amount or the balance is insufficient, the vendor's background system may transmit the necessary information including the order information, the corresponding amount, as well as the payment account number bound to the user, to the background server (a second background server, e.g., the payment server) collaborating in handling the order payment matter; it may be understood that the payment account number bound to the user needs to register with the payment server first (or the payment server obtains information such as the payment account number from an associated other server), such that the payment server may record the order and the amount under the payment account number to settle in real-time with the vendor's background server and returns a successful settlement message to the vendor. The payment server may instantly deduct the payment or generates a postpaid bill under the payment account number; when the mobile terminal or the service providing device (instantly or later) has a network connection, it may retrieve the bill information or the successful settlement feedback message provided by the payment server. Therefore, the mobile terminal or the service providing device only needs to provide relevant information in a two-dimensional code, which may implement an offline operation of service providing or collaborating in service providing without a need of network connection to the background server.

Optionally, after the code information parsing unit successfully parses, the vendor's background system or other background server associated therewith may transmit necessary information in the service information (or related to the service information) to a mobile terminal with a corresponding communication function or accessing to a same network via a proximity wireless communication such as Bluetooth, Infrared or via the Internet, so as to be presented on the display screen of the mobile terminal for the user to view, and/or wait for the user to transmit an indication of content confirmation to the vendor's background system via the mobile terminal. For example, after parsing to obtain the payment account number, the vendor's background system or the payment server may present the order amount to the user; or at this point, the user enters the order amount for confirmation (which may serve as a transmitted service providing request). Besides, the user may provide, in step S201, the entered order amount (service providing request) as part of the service information in a two-dimensional code form. By enabling a corresponding communication function of the mobile terminal, the corresponding feedback message during the service providing procedure (e.g., payment success or failure, balance of the funds, etc.) in the service providing process may be obtained from the vendor's background system or other background server associated therewith.

The mobile terminal or the service providing device may help the user to obtain a service or collaborate in service providing based on the installed client software, e.g., for providing a human-machine interaction interface on the mobile terminal, displaying various alerts and notifications to the user, receiving a confirmation indication transmitted by the user, filling in various information, and service information or code information necessary for generating the two-dimensional code; necessary parameters in the service information provided when generating the two-dimensional code may be automatically substituted in the client software (or after parsing, the parameters to substitute may be obtained from the vendor's background server) to present to the user or actuate the mobile terminal/service providing device to perform corresponding operations, etc.

The user, the mobile terminal, or the service providing device may be required to provide registration information to the operator of the client software in advance according to any manner mentioned above; if necessary, the background system of the operator may communicate various service providing-related information such as the registration information with other background servers, such as the background system of the provider of the service providing device, and a plurality of background servers (the vendor's background system, the payment server, etc.) collaborating in handling service providing.

In another example, the mobile terminal or the service providing device may obtain part of information related to service providing from other place such as the third party server and another mobile terminal, and on this basis, superimpose remaining auxiliary information related to service providing such as the identification information of the mobile terminal or the service providing device, and the attribute information such as the positioned location, so as to generate the corresponding code information and the two-dimensional code via the two-dimensional code generating unit. The form or content of the part of information obtained from other places is not limited. For example, the registration information of the mobile terminal or service providing device for registering with the third party server, identification information of another mobile terminal, or even the information obtained from the mobile terminal first decoding/parsing another received two-dimensional code, etc.

If the parsed service information also includes the corresponding command indicating the vendor's background system to execute the set operations in the service providing flow (and the preconditions for executing the operation), it may be default that the service providing request is in default that the vendor's background system executes a designated operation flow. The operations set based on actual conditions of different services may refer to the operations that are performed by the vendor's background system independently or in collaboration with other background servers, or in collaboration with the mobile terminal or the service providing device.

Figure 13:
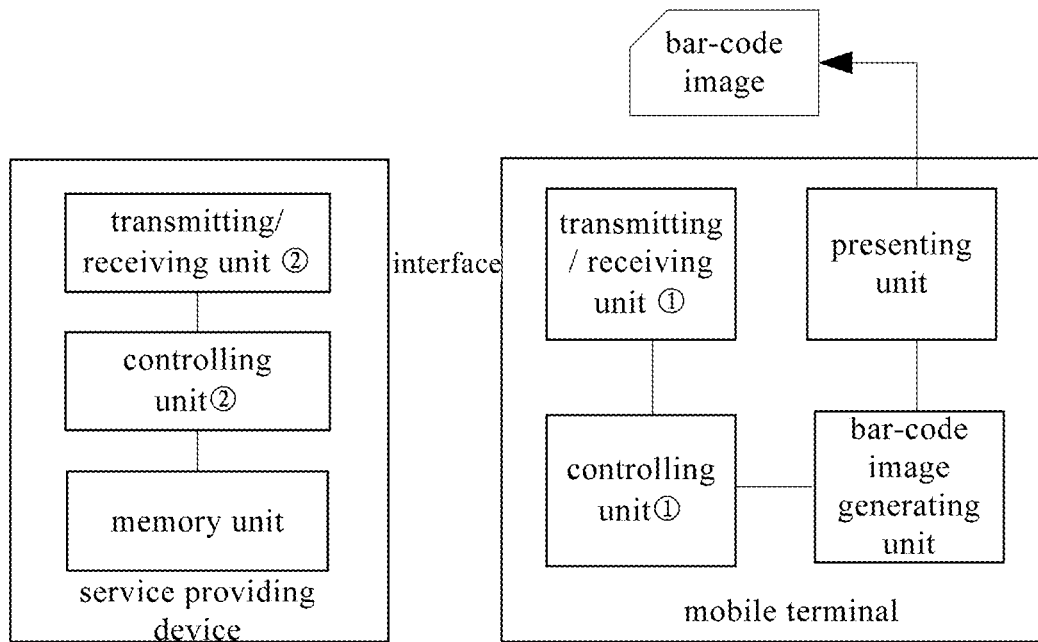
FIG. 13 is a schematic diagram of the structures of a service providing device and a mobile terminal adapted for passive code scanning and their connection relationships in the present disclosure.

An exemplary mobile terminal as shown in FIG. 13 comprises: a code medium generating unit (e.g., the two-dimensional code generating unit); and a presenting unit configured for presenting the code medium generated by the mobile terminal (which may further present various information involved during the interaction process).

It may further comprise some optional modules, such as a first transmitting/receiving unit configured for interacting information with the service providing device (if necessary, with various background servers, or functional modules of the mobile terminal distributed in other mobile terminals) so as to receive services or collaborate in service providing (e.g., obtaining the identification information of the service providing device, or forwarding information to the external via the service providing device, transmitting registration information or receiving registration success information, transmitting a service providing request, transmitting or receiving various feedback notifications during the service providing process); and an input unit for entering input information involved in the interaction process.

The service providing device connected to the interface of the mobile terminal comprises: a second transmitting/receiving unit configured for interacting information with the mobile terminal (or further with various background servers, etc.); and a memory unit configured for storing necessary information (pre-deposited amount, payment account number) required for service providing.

Figure 14:
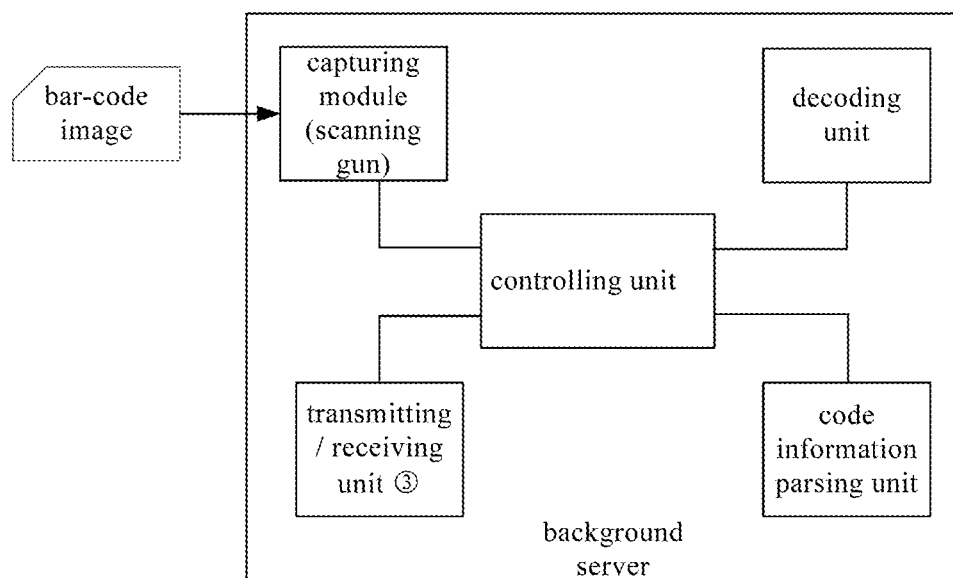
FIG. 14 shows a schematic diagram of a structure of a background server adapted for passive code scanning in the present disclosure.

As shown in FIG. 14, the background server (vendor background system) comprises: an obtaining module configured for obtaining a code medium of a corresponding type; a decoding unit configured for decoding the obtained code medium to obtain code information; code information parsing unit configured for parsing the code information, wherein if the code medium is generated based on a predetermined coding rule, service information corresponding to the code information is extracted; optionally, a third transmitting/receiving unit configured for interacting information with various other background servers (where necessary, further with the mobile terminal or service providing device).

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

I claim:

1. A service providing method based on parsing of code information, comprising:

implementing a connection between a service providing device and a first mobile terminal via an interface of the first mobile terminal at least upon generating code information or a first code medium corresponding thereto or at least upon collaborating in service providing;

wherein the service providing device is a hardware device owned by a user, providing or storing auxiliary information as well as a predetermined coding rule, the auxiliary information at least including: identification information of any one or more of: the user of the first mobile terminal, and the service providing device, the first mobile terminal, the service providing device, and/or information bound to the identification information;

generating, by the first mobile terminal, the service providing device, or a third party code medium generating device respectively designated thereby, code information corresponding to service information according to the predetermined coding rule obtained from the service providing device, and the first code medium corresponding to the code information; wherein the service information includes the auxiliary information;

transmitting, to a first background server or a second mobile terminal, the first code medium, the corresponding code information for generating the first code medium, link information for obtaining the first code medium or the code information corresponding thereto, or a carrier for the first code medium, the code information, or the link information, or releasing the same to a place accessible to a user of the first background server or the user of the second mobile terminal for the first background server or the second mobile terminal to retrieve by themselves; and decoding and parsing the first code medium obtained by the first background server or the second mobile terminal, or parsing the code information obtained by the first background server or the second mobile terminal, to extract the corresponding service information, wherein the first background server or the second mobile terminal provides a service independently based on the extracted service information, or the first background server or the second mobile terminal collaborates with any one or more of collaborators below to provide the service: the first mobile terminal; the service providing device; one or more third party servers or one or more third party mobile terminals designated by the first mobile terminal, the service providing device, the first background server, or the second mobile terminal.

2. The service providing method according to claim 1, wherein:

the first background server or the second mobile terminal or a third party decoding-parsing device respectively designated thereby decodes and parses the obtained code medium or the obtained code information based on the code parsing rule matching the predetermined coding rule, wherein the parsed and extracted service information at least includes command information for actuating the first background server or the second mobile terminal or a collaborator thereof to execute flow of operations respectively set therefor;

when parsing the code information and determining that the first code medium is generated according to the predetermined coding rule, the first background server or the second mobile terminal continues performing the operation of extracting the service information and subsequent operations; and when parsing the code information and determining that the first code medium is not generated according to the predetermined coding rule, the first background server or the second mobile terminal does not performing the operation of extracting the service information or the subsequent operations after prompting a parsing error alert, or providing code information with the parsing error, or providing information which may be linked to an actual corresponding page of the code information with the parsing error or a link to the actual corresponding page.

3. The service providing method according to claim 1, wherein:

the service providing device or the first mobile terminal collaborates in service providing via a client software based on a parameter automatically substituted into the client software; wherein the parameter substituted into the client software comes from one or more sources below: corresponding code information for generating the first code medium, service information for generating the code information corresponding to the first code medium, code information obtained from decoding the first code medium, service information extracted from the parsed code information, and auxiliary information.

4. The service providing method according to claim 3, wherein:

at the time of generating the code medium or at any time point therebefore, the auxiliary information is provided to one or more of the following recipients; or at the time of service providing or collaborating in service providing or at any time point therebefore, the auxiliary information is provided to one or more of the following recipients; wherein the recipients include: the service providing device, the first mobile terminal, the first background server, the second mobile terminal, the third party server, the third party mobile terminal, the third party code medium generating device, an operator system of the client software, and an operator system of the service providing device.

5. The service providing method according to claim 4, wherein:

any interacting part transmits or receives the subsequent information to or from any other one or more interacting parties: interactive information, interactive code information corresponding to the interactive information, or an interactive code medium corresponding to the interactive information, or a carrier of the interactive code medium, or link information for obtaining the interactive information, interactive code medium, or carrier;

wherein the corresponding interactive code information is generated based on the interactive information according to the predetermined coding rule, and then the corresponding interactive code medium is generated based on the interactive code information;

the interactive information includes one or more of:

extracted service information;

intermediate information needed for service providing;

notification information for feeding back a service providing result;

identification information of any one or more of: the first mobile terminal, the service providing device, the first background server, the second mobile terminal, the third mobile terminal, the third party server, user of the first mobile terminal or the second mobile terminal or the third party mobile terminal, an operator of the first background server or the third part server;

information correspondingly bound to the identification information;

attribute information corresponding to one or more of: the user of the first mobile terminal and the service providing device, the first mobile terminal, or the service providing device; and the interacting parties include the first mobile terminal, the service providing device, the first background server, the second mobile terminal, the third party mobile terminal, and the third party server.

6. The service providing method according to claim 1, wherein:

the service providing device or the first mobile terminal stores a designated account number or link information for retrieving the designated account number, or stores a pre-saved code medium or a carrier thereof;

corresponding code information obtained from recognizing and decoding the pre-saved code medium or a result of parsing the code information corresponding to the pre-saved code medium includes the designated account number or the link information for retrieving the designated account number;

the designated account number refers to an account number bound to the identification of any one or more of: the service providing device, the first mobile terminal, the user of the first mobile terminal and the service providing device, a payer designed by the user of the first mobile terminal and the service providing device; and any of the first background server, the third party server, the second mobile terminal or the third party mobile terminal as a payer, which obtains the designated account number, the link information for obtaining the designated account number, the pre-saved code medium, or the carrier for the pre-saved code medium, deducts an order-related payments from the pre-deposited amount under the designated account number, or generates, for the designated account number, a postpaid bill for the order-related payment.

7. The service providing method according to claim 1, wherein:

the service providing device is a USB device with a USB connector, which is connected to the first mobile terminal with a corresponding USB interface;

or, the service providing device is a memory card, which is connected to a first mobile terminal with a corresponding memory card slot or memory card interface;

or, the service providing device is a SIM card, which is connected to a first mobile terminal with a corresponding SIM card slot or SIM card interface;

or, the service providing device is an eSIM card, which is connected to a first mobile terminal with a corresponding eSIM card integration interface or is integrated in the first mobile terminal;

or, the service providing device is a device having a wired or wireless communication interface, which is in signal connection with a first mobile terminal having a corresponding wired or wireless communication interface, wherein the signal connection allows the service providing device to communicate with the first mobile terminal in the case of offline or online;

or, the service providing device is a combination of at least two components that are respectively connected to the first mobile terminal in same or different manners; one component in the combination is any one in a first group including a USB device, a memory card, a SIM card, an eSIM card, and a device with a wired or wireless communication interface; the other component in the combination is any one in a second group including a USB device, a memory card, a SIM card, an eSIM card, and a device with a wires or wireless communication interface.

8. The service providing method according to claim 7, wherein:

the service providing device is a component having a code information parsing unit and storing a designated account number or a pre-saved code medium;

or, the service providing device is a combination of two components, where one component has the code information parsing unit and the other component stores the designated account number or the pre-saved code medium;

wherein the code information parsing unit stores the predetermined coding rule, or stores the predetermined coding rule and a code parsing rule matching thereto; and the code information parsing unit further parses the code information corresponding to the pre-saved code medium.

9. The service providing method according to claim 1, wherein:

the service providing device or the first mobile terminal checks and compares verification information provided by the user of the first mobile terminal and the service providing device with verification-comparison information stored in the service providing device, the first mobile terminal, the background server, or the third party server; wherein the service is provided when it is determined that the verification information is consistent with the verification-comparison information.

10. The service providing method according to claim 1, wherein:

the first code medium or interactive code medium respectively refers to any one or any combination of: a bar code image generated in a pattern of one-dimensional code, two-dimensional code, or multi-dimensional code; an optical lattice diagram generated in a form of light-shadow ray or refurbishing frequency variation or in a form of visible light or UV or infrared light or polarized light; and a digitalized acoustic wave or radio wave generated with a specific law or a specific frequency variation pattern.

11. A service providing system, wherein:

at least at the time of generating code information or a first code medium corresponding thereto, or at least at the time of collaborating for service providing, a service providing device is enabled to implement connection with a first mobile terminal via an interface of the first mobile terminal; wherein the service providing device is a hardware device owned by a user, having a memory unit which stores a predetermined coding rule as well as auxiliary information, wherein the auxiliary information includes identification information of any one or more of: the user of the first mobile terminal and the service providing device, the first mobile terminal, the service providing device, and/or information bound to the identification information;

a code medium generating unit configured to the service providing device generates, or the service providing device actuates a further code medium generating unit configured to the first mobile terminal to generate, the code information corresponding to the service information and a first code medium corresponding to the code information according to the predetermined coding rule obtained from the service providing device; and a transmitting/receiving unit configured to the service providing device transmits, or the service providing device actuates a further transmitting/receiving unit configured to the first mobile terminal to transmit, the first code medium, the corresponding code information for generating the first code medium, link information for obtaining the first code medium or the code information corresponding to the first code medium, or a carrier for the first code medium or the code information or the link information, to a first background server or a second mobile terminal, or releases/to release the same to a place accessible to the first background server or the user of the second mobile terminal, for the first background server or the second mobile terminal to retrieve by themselves;

the first code medium received or the first code medium obtained by the obtaining unit is decoded by the first background server or the second mobile terminal via a decoding unit; the code information received or the code information obtained by the decoding unit is parsed by the first background server or the second mobile terminal via the code information parsing unit so as to extract corresponding service information and obtain the auxiliary information included therein;

the first background server or the second mobile terminal separately provides a service based on the extracted service information, or the first background server or the second mobile terminal provides a service through collaboration with any one or more of following collaborators: the first mobile terminal, the service providing device, one or more third party servers or one or more third party mobile terminals designated by the first mobile terminal, the service providing device, the first background server, or the second mobile terminal.

12. The service providing system according to claim 11, wherein:
the service providing device or the first mobile terminal collaborates in service providing via a d client software based on a parameter automatically substituted into the client software;
the parameter substituted into the client software comes from one or more sources below: corresponding code information for generating a first code medium, service information for generating the code information corresponding to the first code medium, code information obtained from decoding the first code medium, service information extracted from the parsed code information, and auxiliary information;
wherein the code information obtained by decoding the first code medium or the service information extracted after parsing the code information is obtained from decoding and parsing by a code information parsing unit respectively configured to the service providing device or the first mobile terminal, or obtained from decoding and parsing by a code information parsing unit respectively configured to the first background server or the second mobile terminal.

13. The service providing system according to claim 11, wherein:
the transmitting/receiving unit of the service providing device or the first mobile terminal provides auxiliary information to one or more of the following recipients at the time of generating the code medium or at any time point therebefore; or provides the auxiliary information to any one or more recipients below at the time of service providing or collaborating for service providing or at any time point therebefore;
the recipients include: a first background server, a second mobile terminal, a third party server, a third party mobile terminal, an operator system of the client software, and an operator system of the service providing device.

14. The service providing system according to claim 11, wherein:
the mobile terminal is provided with a presenting unit for presenting a first code medium generated by the mobile terminal or the service providing device for one or more times; the first background server, the second mobile terminal, the third party server, or the third party mobile terminal decodes and parses the presented first code medium to obtain one or more of the following interactive information:
service information;
intermediate information needed for service providing;
notification information for feeding back a service providing result;
identification information of any one or more of: the first mobile terminal, the service providing device, the first background server, the second mobile terminal, the third mobile terminal, the third party server, user of the first mobile terminal, user of the second mobile terminal, user of the third party mobile terminal, an operator of the first background server, or an operator of the third part server;
information correspondingly bound to the identification information of any one or more parties above, and
attribute information corresponding to one or more of: the user of the first mobile terminal and the service providing device, the first mobile terminal, or the service providing device.

15. The service providing system according to claim 11, wherein:
the service providing device is any one of a USB device, a memory card, a SIM card, an eSIM card, and a device having a wired or wireless communication interface, and the first mobile terminal connected thereto has a corresponding USB interface, a memory card slot or a memory card interface, a SIM card slot or SIM card interface, eSIM card integration interface, or a wired or wireless communication interface;
or, the service providing device is a combination of at least two components that are respectively connected to the first mobile terminal in same or different manners, wherein one component in the combination has a code information parsing unit, referring to any one in a first group including a USB device, a memory card, a SIM card, an eSIM card, and a device with a wired or wireless communication interface; the other component in the combination has a memory unit, referring to any one in a second group including a USB device, a memory card, a SIM card, an eSIM card, and a device with a wires or wireless communication interface;
or, the first mobile terminal is a standalone device or a combination of a plurality of devices, wherein at least one device of the plurality of devices in the first combination is a wearable device; and the service providing device connected to the first mobile terminal refers to a USB device, a memory card, a SIM card, an eSIM card, or a device with a wired or wireless communication interface;

or, the first mobile terminal is a combination of a body part and a plurality of external parts, wherein the presenting unit of the first mobile terminal is disposed in the body part or in the at least one external part; the service providing device refers to a USB device, a memory card, a SIM card, an eSIM card, or a device with a wired or wireless communication interface, which is connected to the body part of the mobile terminal or at least one externally connected part.

16. The service providing system according to claim 11, wherein:

the first mobile terminal is further provided with an acquiring module configured for acquiring attribute information corresponding to one or more of: the user of the first mobile terminal and the service providing device, the first mobile terminal, or the service providing device, or configured for acquiring verification information provided by the user so as to check and compare the verification with the verification-comparison information pre-saved in the first mobile terminal, the service providing device, the first background server, or the second mobile terminal.

17. A mobile terminal, wherein:

at least at the time of generating code information or a first code medium corresponding thereto, or at least at the time of collaborating for service providing, a first mobile terminal is enabled to implement connection with a service providing device via an interface of the first mobile terminal; wherein the service providing device is a hardware device owned by a user, having a memory unit which stores a predetermined coding rule as well as auxiliary information, wherein the auxiliary information includes identification information of any one or more of: the user of the first mobile terminal and the service providing device, the first mobile terminal, the service providing device, and/or information bound to the identification information;

a code medium generating unit configured to the service providing device generates, or the service providing device actuates a further code medium generating unit configured to the first mobile terminal to generate, the code information corresponding to the service information and a first code medium corresponding to the code information according to the predetermined coding rule obtained from the service providing device; and a transmitting/receiving unit configured to the service providing device transmits, or the service providing device actuates a further transmitting/receiving unit configured to the first mobile terminal to transmit, the first code medium, the corresponding code information for generating the first code medium, link information for obtaining the first code medium or the code information corresponding to the first code medium, or a carrier for the first code medium or the code information or the link information, to a first background server or a second mobile terminal, or releases/to release the same to a place accessible to the first background server or the user of the second mobile terminal, for the first background server or the second mobile terminal to retrieve by themselves;

the first code medium received or the first code medium obtained by the obtaining unit is decoded by the first background server or the second mobile terminal via a decoding unit; the code information received or the code information obtained by the decoding unit is parsed by the first background server or the second mobile terminal via the code information parsing unit so as to extract corresponding service information and obtain the auxiliary information included therein;

the first background server or the second mobile terminal separately provides a service based on the extracted service information, or the first background server or the second mobile terminal provides a service through collaboration with any one or more of following collaborators: the first mobile terminal, the service providing device, one or more third party servers or one or more third party mobile terminals designated by the first mobile terminal, the service providing device, the first background server, or the second mobile terminal.

18. The mobile terminal according to claim 17, wherein:

the service providing device or the first mobile terminal collaborates in service providing via a d client software based on a parameter automatically substituted into the client software;

the parameter substituted into the client software comes from one or more sources below: corresponding code information for generating a first code medium, service information for generating the code information corresponding to the first code medium, code information obtained from decoding the first code medium, service information extracted from the parsed code information, and auxiliary information;

wherein the code information obtained by decoding the first code medium or the service information extracted after parsing the code information is obtained from decoding and parsing by a code information parsing unit respectively configured to the service providing device or the first mobile terminal, or obtained from decoding and parsing by a code information parsing unit respectively configured to the first background server or the second mobile terminal.

19. The mobile terminal according to claim 17, wherein:

the transmitting/receiving unit of the service providing device or the first mobile terminal provides auxiliary information to one or more of the following recipients at the time of generating the code medium or at any time point therebefore; or provides the auxiliary information to any one or more recipients below at the time of service providing or collaborating for service providing or at any time point therebefore;

the recipients include: a first background server, a second mobile terminal, a third party server, a third party mobile terminal, an operator system of the client software, and an operator system of the service providing device.

20. The mobile terminal according to claim 17, wherein:

the mobile terminal is provided with a presenting unit for presenting a first code medium generated by the mobile terminal or the service providing device for one or more times; the first background server, the second mobile terminal, the third party server, or the third party mobile terminal decodes and parses the presented first code medium to obtain one or more of the following interactive information:

service information;

intermediate information needed for service providing;

notification information for feeding back a service providing result;

identification information of any one or more of: the first mobile terminal, the service providing device, the first background server, the second mobile terminal, the third mobile terminal, the third party server, user of the first mobile terminal, user of the second mobile terminal, user of the third party mobile terminal, an operator of the first background server, or an operator of the third part server;

information correspondingly bound to the identification information of any one or more parties above, and attribute information corresponding to one or more of: the user of the first mobile terminal and the service providing device, the first mobile terminal, or the service providing device.

21. The mobile terminal according to claim 17, wherein:

the service providing device is any one of a USB device, a memory card, a SIM card, an eSIM card, and a device having a wired or wireless communication interface, and the first mobile terminal connected thereto has a corresponding USB interface, a memory card slot or a memory card interface, a SIM card slot or SIM card interface, eSIM card integration interface, or a wired or wireless communication interface;

or, the service providing device is a combination of at least two components that are respectively connected to the first mobile terminal in same or different manners, wherein one component in the combination has a code information parsing unit, referring to any one in a first group including a USB device, a memory card, a SIM card, an eSIM card, and a device with a wired or wireless communication interface; the other component in the combination has a memory unit, referring to any one in a second group including a USB device, a memory card, a SIM card, an eSIM card, and a device with a wires or wireless communication interface;

or, the first mobile terminal is a standalone device or a combination of a plurality of devices, wherein at least one device of the plurality of devices in the first combination is a wearable device; and the service providing device connected to the first mobile terminal refers to a USB device, a memory card, a SIM card, an eSIM card, or a device with a wired or wireless communication interface;

or, the first mobile terminal is a combination of a body part and a plurality of external parts, wherein the presenting unit of the first mobile terminal is disposed in the body part or in the at least one external part; the service providing device refers to a USB device, a memory card, a SIM card, an eSIM card, or a device with a wired or wireless communication interface, which is connected to the body part of the mobile terminal or at least one externally connected part.

22. The mobile terminal according to claim 17, wherein:

the first mobile terminal is further provided with an acquiring module configured for acquiring attribute information corresponding to one or more of: the user of the first mobile terminal and the service providing device, the first mobile terminal, or the service providing device, or configured for acquiring verification information provided by the user so as to check and compare the verification with the verification-comparison information pre-saved in the first mobile terminal, the service providing device, the first background server, or the second mobile terminal.

* * * * *